(12) United States Patent
Eun et al.

(10) Patent No.: US 8,400,648 B2
(45) Date of Patent: Mar. 19, 2013

(54) IMAGE FORMING APPARATUS, AUTHENTICATION METHOD, AND PROGRAM

(75) Inventors: Jongsook Eun, Tokyo (JP); Tetsuro Kino, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 653 days.

(21) Appl. No.: 12/591,877

(22) Filed: Dec. 3, 2009

(65) Prior Publication Data

US 2010/0149574 A1 Jun. 17, 2010

(30) Foreign Application Priority Data

Dec. 12, 2008 (JP) .................................. 2008-317330

(51) Int. Cl.
*G06F 3/12* (2006.01)
(52) U.S. Cl. ...................... 358/1.13; 358/1.15; 358/1.18; 235/382; 340/5.8; 340/5.81; 340/5.86; 726/1; 726/2; 726/28
(58) Field of Classification Search .................. 358/1.13, 358/1.15, 1.18; 235/382; 340/5.8, 5.81, 340/5.86; 726/1, 2, 28
See application file for complete search history.

(56) References Cited

U.S. PATENT DOCUMENTS

| | | | |
|---|---|---|---|
| 6,490,049 B1 | 12/2002 | Cunnagin et al. | |
| 2004/0162982 A1* | 8/2004 | Komai | 713/168 |
| 2006/0077430 A1* | 4/2006 | Zhang et al. | 358/1.15 |
| 2007/0121174 A1* | 5/2007 | Higashiura | 358/464 |
| 2008/0316539 A1* | 12/2008 | Mori | 358/3.28 |

FOREIGN PATENT DOCUMENTS

| | | |
|---|---|---|
| JP | 10-67160 | 3/1998 |
| JP | 11-143834 | 3/1999 |
| JP | 2001-344212 | 12/2001 |
| JP | 2004-276271 | 7/2004 |
| JP | 2004-226843 | 8/2004 |
| JP | 2004-246715 | 9/2004 |
| JP | 2006-309698 | 11/2006 |
| JP | 2007-156675 | 6/2007 |
| JP | 2008-046867 | 2/2008 |

\* cited by examiner

*Primary Examiner* — Jacky X Zheng
(74) *Attorney, Agent, or Firm* — Harness, Dickey & Pierce

(57) ABSTRACT

Disclosed is an image forming apparatus that include a personal identification method acquisition unit that extracts an identification method for identifying an operator from a first image scanned by an image scanning unit; a verification information extraction unit that extracts verification information with respect to personal identification information of the operator from the first image; a personal identification information acquisition unit that acquires the personal identification information in accordance with the identification method; a verification unit that verifies the acquired personal identification information with the verification information; and an authentication unit that authenticates the operator based on authentication information of the operator extracted from the first image when the personal identification information matches with the verification information.

7 Claims, 22 Drawing Sheets

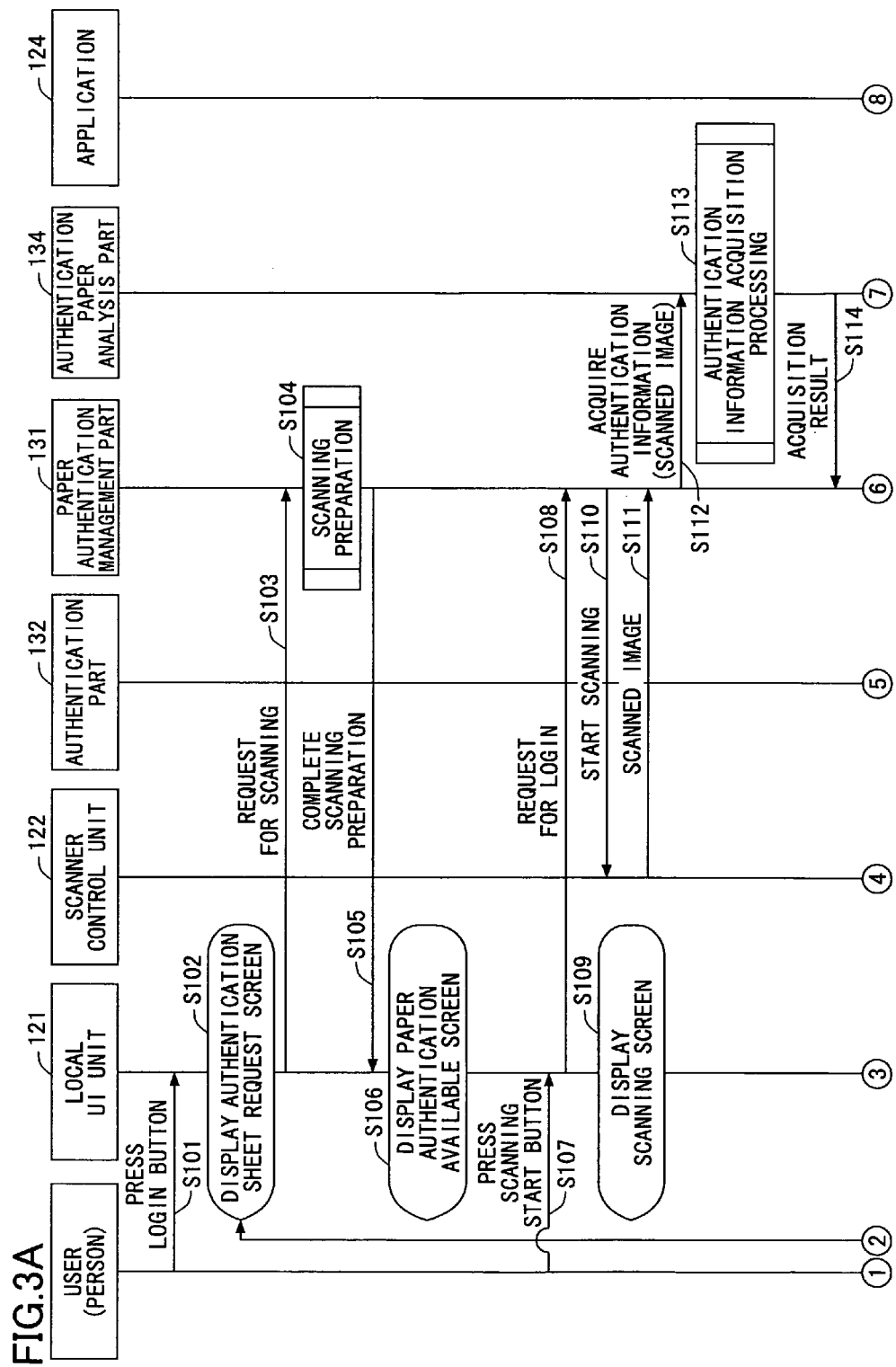

FIG.8

| | A. SHEET TYPE | B. SETTING POSITION | C. DIRECTION | D. SIZE | E. MATERIAL | G. SHEET ID | H. EMBEDDED DATA FORM | J. PERSONAL IDENTIFICATION METHOD | K. AUTHENTICATION INFORMATION | M. SHEET COLOR |
|---|---|---|---|---|---|---|---|---|---|---|
| 1 | AUTHENTICATION SHEET | PLATEN | VERTICAL DIRECTION | A4 | SHEET | PUBLISHER ID | QR CODE | NO IDENTIFICATION | USER ID | BLACK AND WHITE |
| 2 | PERSONAL IDENTIFICATION SHEET | ADF | HORIZONTAL DIRECTION | B5 | OHP | USER ID | BAR CODE | AND COMBINATION | PASSWORD | COLOR |
| 3 | | | | A5 | | PUBLICATION-MACHINE ID | | OR COMBINATION | MANAGER'S NAME | |
| 4 | | | | | | USE-MACHINE ID | | MANUAL INPUT OF PIN | PIN | |

400

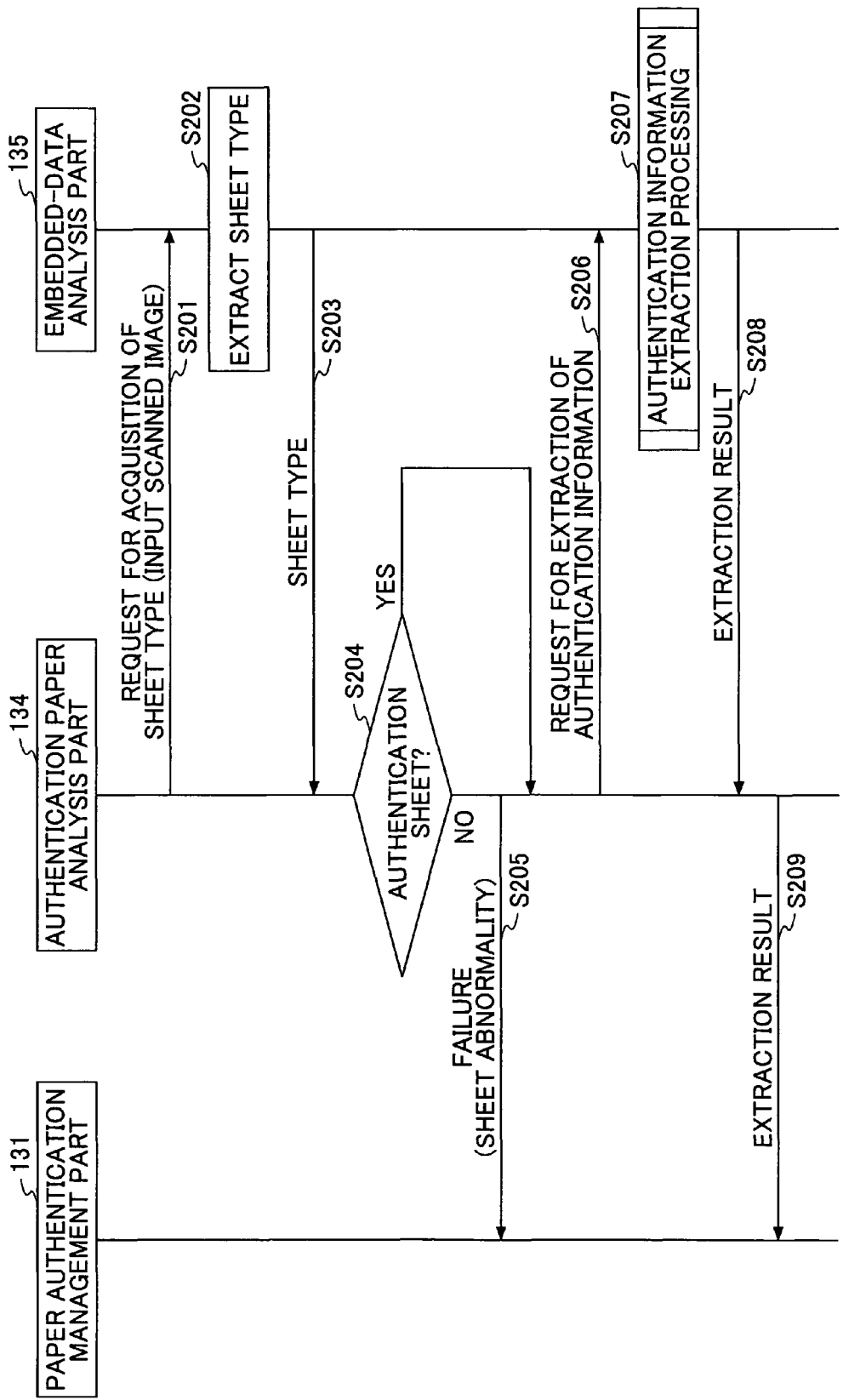

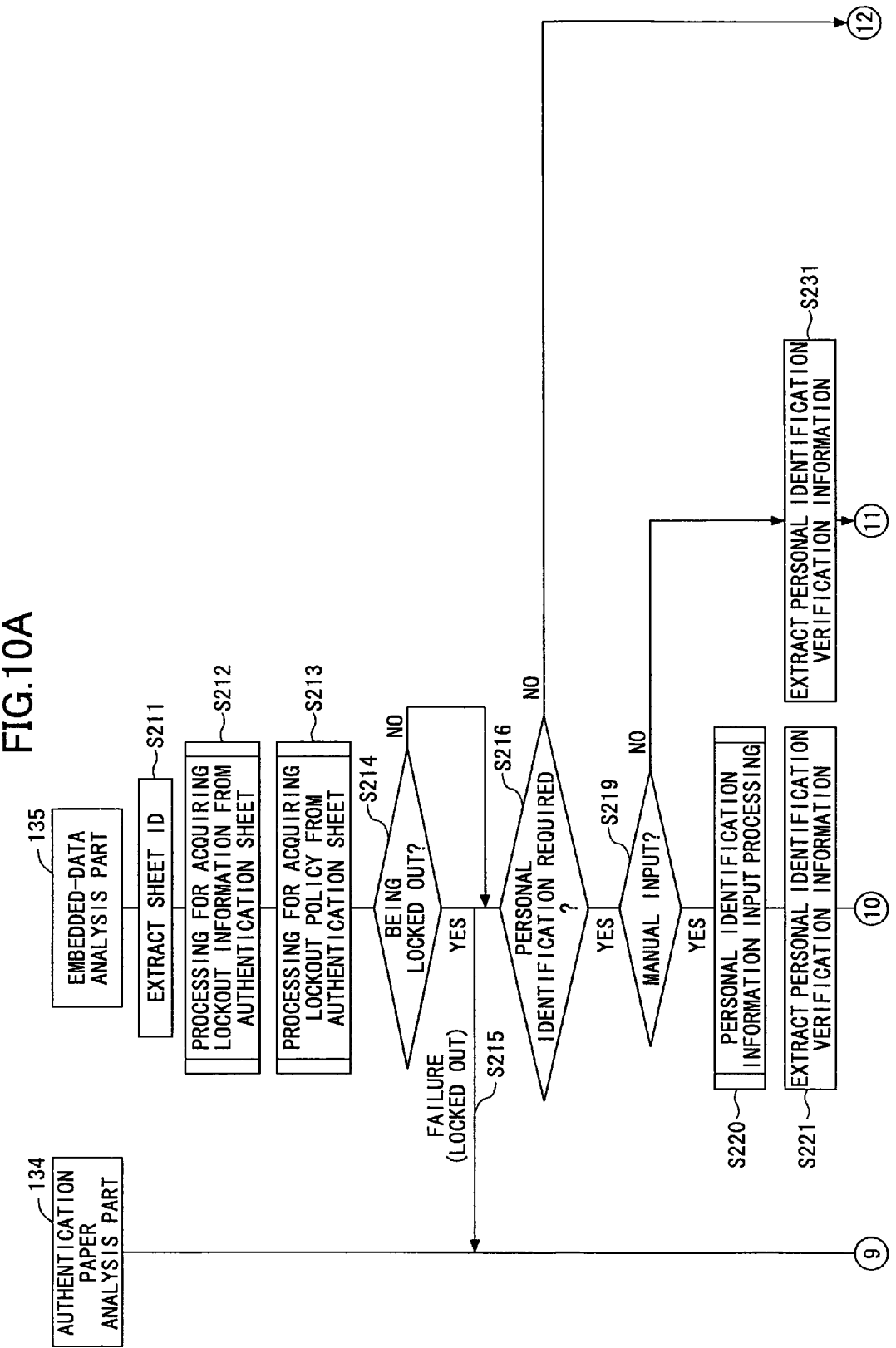

FIG.11

| SHEET ID | 222 |
|---|---|
| THE NUMBER OF PERSONAL IDENTIFICATION FAILURE TIMES | 2 |
| LOCKOUT TIME LIMIT | YYYY/MM/DD |

| OBJECT TO BE LOCKED OUT | AUTHENTICATION SHEET |
|---|---|
| LOCKOUT CONDITION | PERSONAL IDENTIFICATION FAILS THREE TIMES |
| LOCKOUT DURATION | 60 MINUTES |

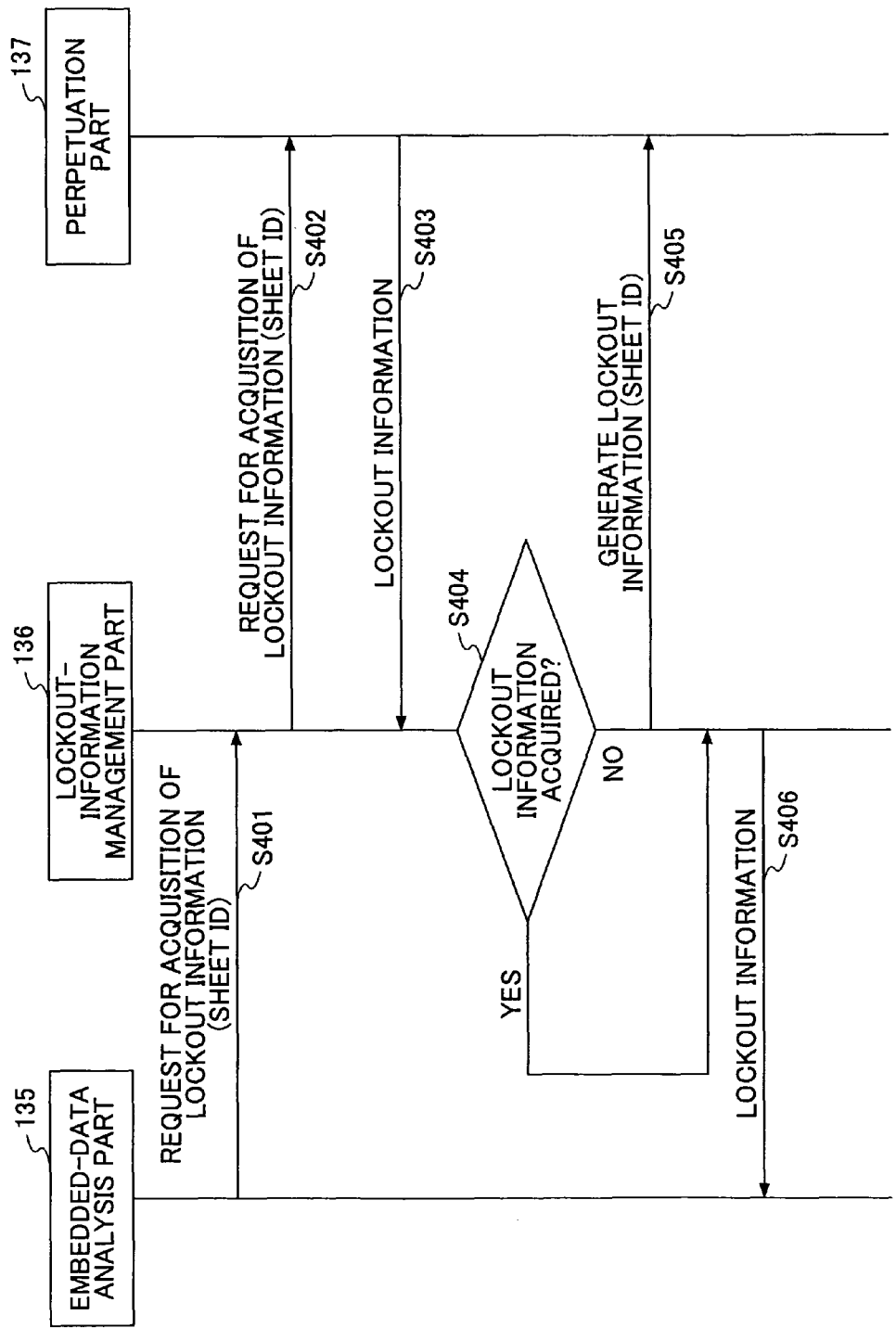

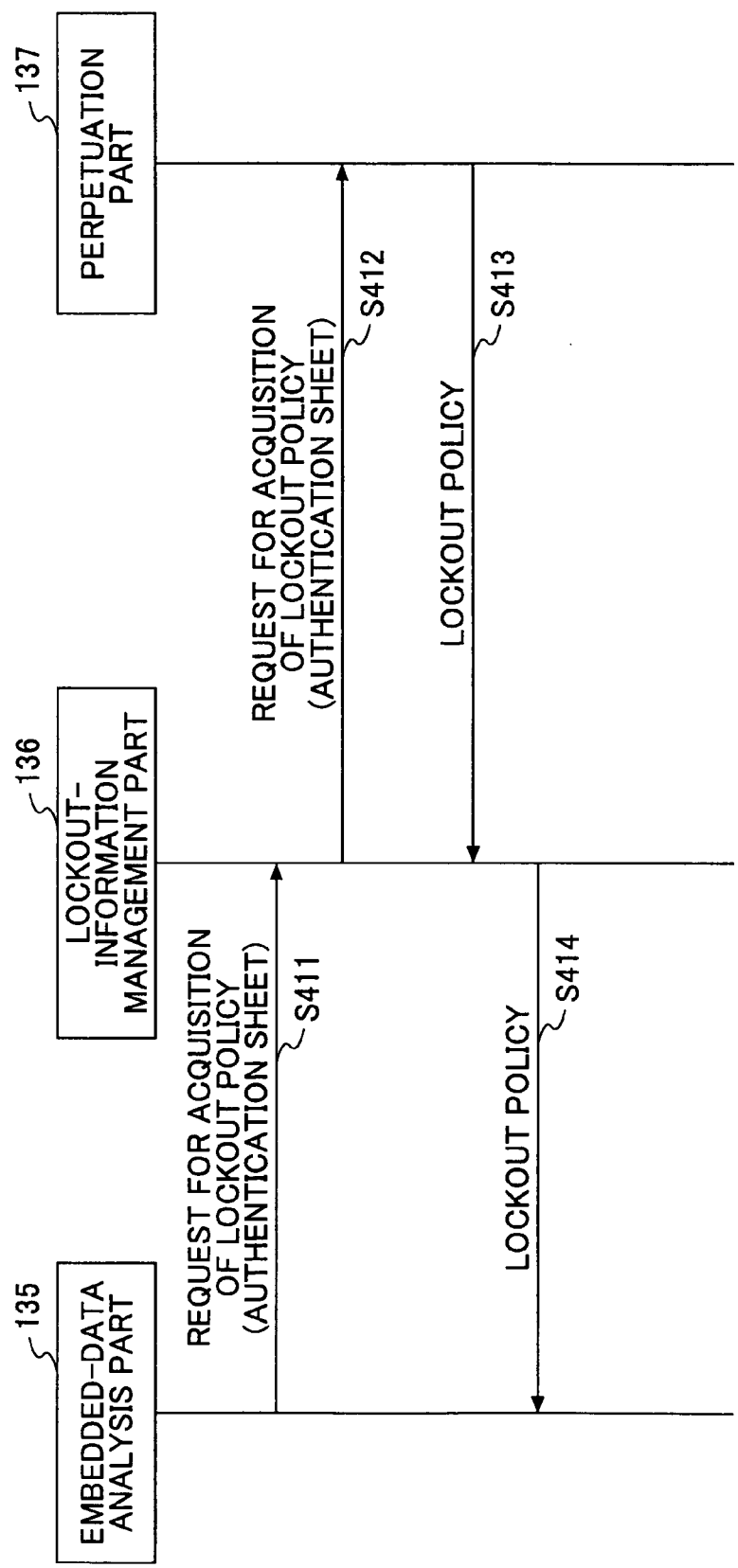

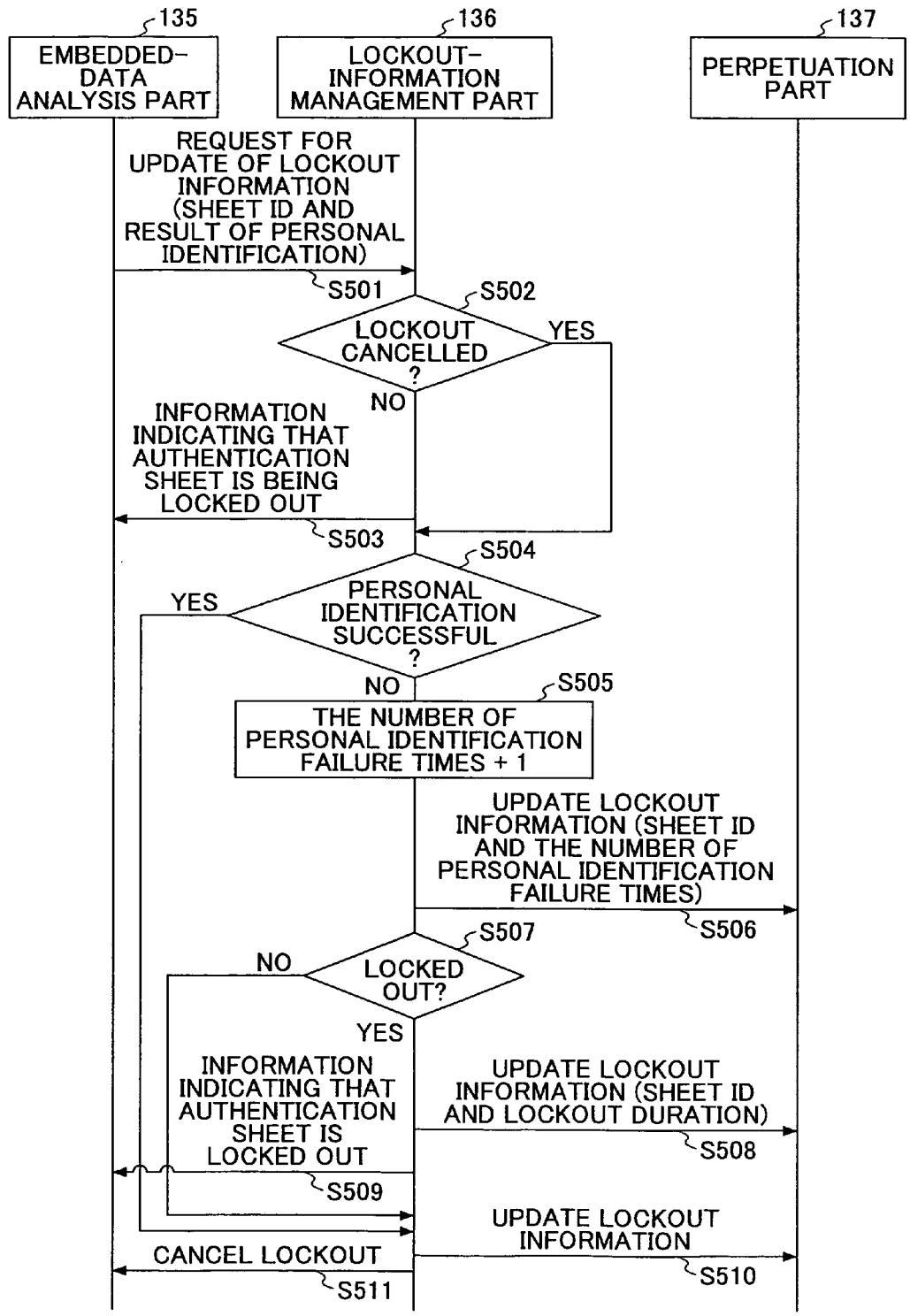

IMAGE FORMING APPARATUS, AUTHENTICATION METHOD, AND PROGRAM

BACKGROUND OF THE INVENTION

1. Field of the Invention

The present invention relates to image forming apparatuses, authentication methods, and programs and, in particular, to an image forming apparatus, an authentication method, and a program that give use permission to an authenticated operator.

2. Description of the Related Art

Conventionally, in order to improve security, image forming apparatuses such as multi-task machines permit authorization of use according to users if the users are authenticated based on user names and passwords.

Meanwhile, general computer systems have put various authentication methods, such as IC-card authentication, fingerprint authentication, and vein pattern authentication besides so-called password authentication, to practical use. Further improved security or convenience with the adoption of such authentication methods to image forming apparatuses is expected.

Patent Document 1: JP-A-2004-276271

However, IC-card authentication, fingerprint authentication, and vein pattern authentication require dedicated authentication devices such as an IC-card reader, a fingerprint reader, and a vein pattern reader, which in turn increase costs of the entire image forming apparatuses.

On the other hand, some image forming apparatuses do not permit the input of user names and passwords depending on the configuration of an operations panel. In such image forming apparatuses, authentication may be performed by a PIN (Personal Identification Number). However, in order to assure high security only by a PIN, the number of digits of a PIN must be increased. This results in deterioration of convenience.

SUMMARY OF THE INVENTION

The present invention has been made in light of the above drawbacks and may provide an image forming apparatus, an authentication method, and a program capable of properly performing user authentication without adopting dedicated authentication devices.

According to an aspect of the present invention, there is provided an image forming apparatus that includes a personal identification method acquisition unit that extracts an identification method for identifying an operator from a first image scanned by an image scanning unit; a verification information extraction unit that extracts verification information with respect to personal identification information of the operator from the first image; a personal identification information acquisition unit that acquires the personal identification information in accordance with the identification method; a verification unit that verifies the acquired personal identification information with the verification information; and an authentication unit that authenticates the operator based on authentication information of the operator extracted from the first image when the personal identification information matches with the verification information.

Other objects, features and advantages of the present invention will become more apparent from the following detailed description when read in conjunction with the accompanying drawings.

BRIEF DESCRIPTION OF THE DRAWINGS

FIGS. 3A and 3B are sequence diagrams for explaining the processing procedure of paper authentication processing in the image forming apparatus;

FIG. 8 is a diagram showing an example of an embedded-data definition table;

FIG. 9 is a sequence diagram for explaining the processing procedure of processing for acquiring authentication information from the authentication sheet;

FIGS. 10A and 10B are sequence diagrams for explaining the processing procedure of authentication information extraction processing;

FIG. 11 is a diagram showing a configuration example of lockout information;

FIG. 12 is a diagram showing a configuration example of a lockout policy;

FIG. 18 is a sequence diagram for explaining the processing procedure of lockout information acquisition processing;

FIG. 19 is a sequence diagram for explaining the processing procedure of lockout policy acquisition processing; and FIG. 20 is a sequence diagram for explaining the processing procedure of lockout information update processing.

DETAILED DESCRIPTION OF THE PREFERRED EMBODIMENTS

Figure 1:
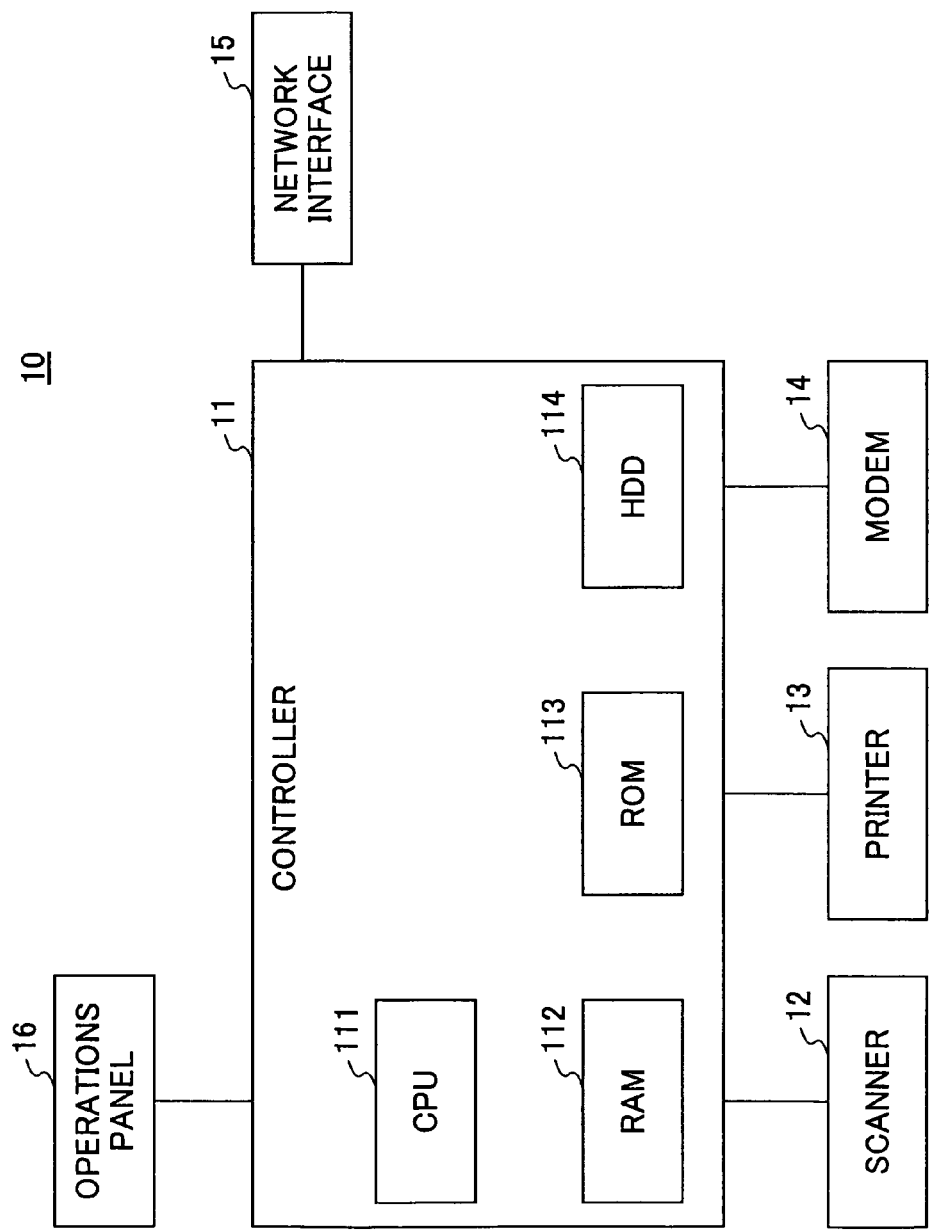
FIG. 1 is a diagram showing a hardware configuration example of an image forming apparatus according to an embodiment of the present invention.

Next, an embodiment of the present invention is described below with reference to the accompanying drawings. FIG. 1 is a diagram showing a hardware configuration example of an image forming apparatus according to the embodiment of the present invention. In FIG. 1, the image forming apparatus 10 has hardware devices such as a controller 11, a scanner 12, a printer 13, a modem 14, a network interface 15, and an operations panel 16.

The controller 11 is composed of a CPU 111, a RAM 112, a ROM 113, a HDD 114, and the like. The ROM 113 stores various programs, data used for the programs, and the like. The RAM 112 is used as a storage area for loading the programs, a work area for the loaded programs, and the like. The CPU 111 processes the programs loaded in the RAM 112 to implement various functions. The HDD 114 stores programs, various data used for the programs, and the like.

The scanner 12 is a hardware device for scanning image data from a document. The printer 13 is a hardware device for printing image data on a print sheet. The modem 14 is a hardware device for connecting to a telephone line and used for executing the transmission and reception of image data through facsimile communications. The network interface 15 is a hardware device for connecting to a network (regardless of whether it is wired or wireless) such as a LAN (Local Area Network). The operations panel 16 is a hardware device equipped with an input unit such as a button, a display unit such as a liquid crystal panel, and the like.

Figure 2:
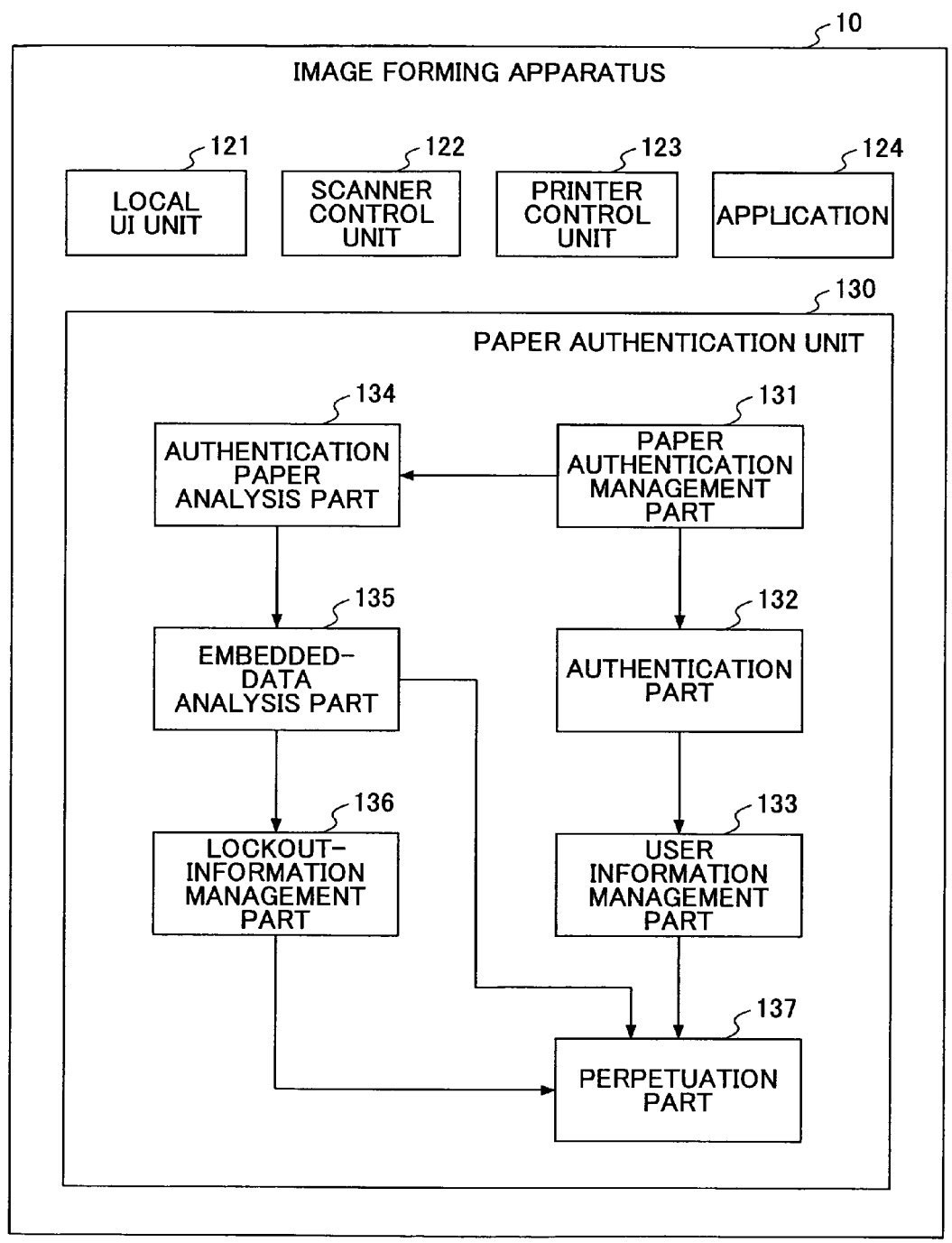
FIG. 2 is a diagram showing a software configuration example of the image forming apparatus according to the embodiment of the present invention.

FIG. 2 is a diagram showing a software configuration example of the image forming apparatus according to the embodiment of the present invention. In FIG. 2, the image forming apparatus 10 has a local UI unit 121, a scanner control unit 122, a printer control unit 123, an application 124, a paper authentication unit 130, and the like. These units are programs that implement their functions when the CPU 111 executes processing.

The local UI unit 121 performs the display-control of various operations screens for using the functions of the image forming apparatus 10, and the like. The scanner control unit 122 controls the scanner 12 and causes the scanner 12 to perform the scanning of image data from a scannable recording medium (such as a sheet and an OHP (overhead projector) sheet). The printer control unit 123 controls the printer 13 and causes the printer 13 to execute the printing of image data. The application 124 is a program directly used by a user and controls the execution of a job (such as a scan job and a copy job) requested by the user. In the embodiment, the application 124 can be used only by an authenticated user.

The paper authentication unit 130 is a program group for performing authentication (hereinafter referred to as "paper authentication") using the scanner 12 as a unit for inputting authentication information. The paper authentication unit 130 has a paper authentication management part 131, an authentication part 132, a user information management part 133, an authentication paper analysis part 134, an embedded-data analysis part 135, a lockout-information management part 136, a perpetuation part 137, and the like.

The paper authentication management part 131 entirely controls processing for extracting authentication information from a scannable recording medium in which the authentication information is recorded (embedded). In the embodiment, the scannable recording medium in which the authentication information is embedded is called an "authentication sheet." Note that as described below, data other than the authentication information are also embedded in the authentication sheet.

The authentication part 132 executes processing for authenticating the user by using the authentication information extracted from the authentication sheet. In other words, the contents of the authentication information depend on the type of authentication performed by the authentication part 132. In the case of password authentication, a user name and a password correspond to the authentication information.

The user information management part 133 recognizes the configuration of user information of each user capable of using the image forming apparatus 10. The substance of the user information is managed by the perpetuation part 137. Note that the authentication information is contained as a part of the user information.

The authentication paper analysis part 134 controls processing for extracting data embedded in the authentication sheet. The embedded-data analysis part 135 extracts and analyzes the data embedded in the authentication sheet.

The lockout-information management part 136 recognizes the configuration of lockout information of the authentication sheet. The substance of the lockout information is managed by the perpetuation part 137. Note that the lockout information is information for discriminating the validity of the authentication sheet. In the embodiment, the authentication sheet meeting predetermined conditions is locked out (invalidated) and thus cannot be used.

The perpetuation part 137 systematically manages various data by using the HDD 114. However, the perpetuation part 137 does not manage the contents of data. A specific example of the perpetuation part 137 is a file system.

Figure 3B:
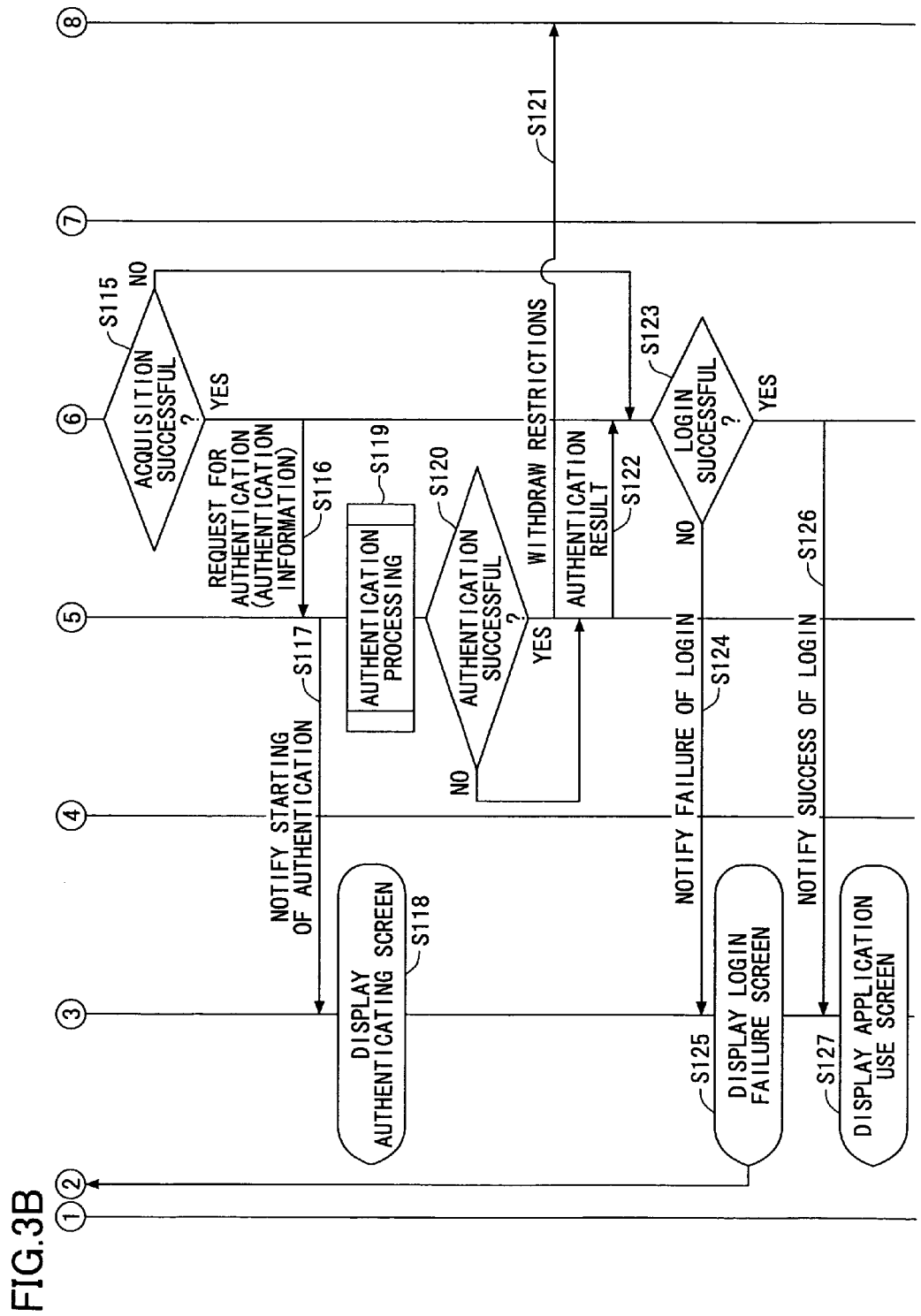

Next, the processing procedure of the image forming apparatus 10 is described. FIG. 3 is a sequence diagram for explaining the processing procedure of paper authentication processing in the image forming apparatus 10.

In step S101, the user presses a login button on an initial screen displayed on the operations panel 16 by the local UI unit 121. Then, the local UI unit 121 displays on the operations panel 16 a screen (authentication sheet request screen) requesting the setting of the authentication sheet in the scanner 12 (S102). Next, the local UI unit 121 requests the paper authentication management part 131 to prepare for scanning for the paper authentication (S103). In response to the request, the paper authentication management part 131 executes preparation processing for scanning (S104). Upon completion of the preparation processing, the paper authentication management part 131 notifies the local UI unit 121 of the completion of the preparation processing for scanning (S105). In response to the notification, the local UI unit 121 displays on the operations panel 16 a screen (paper authentication available screen) indicating that the paper authentication is in an executable state (S106).

On the other hand, the user sets his/her authentication sheet on the scanner 12 when the authentication sheet request screen is displayed. That is, the authentication sheet in which the authentication information or the like of the user is recorded is distributed to the user.

Figure 4:
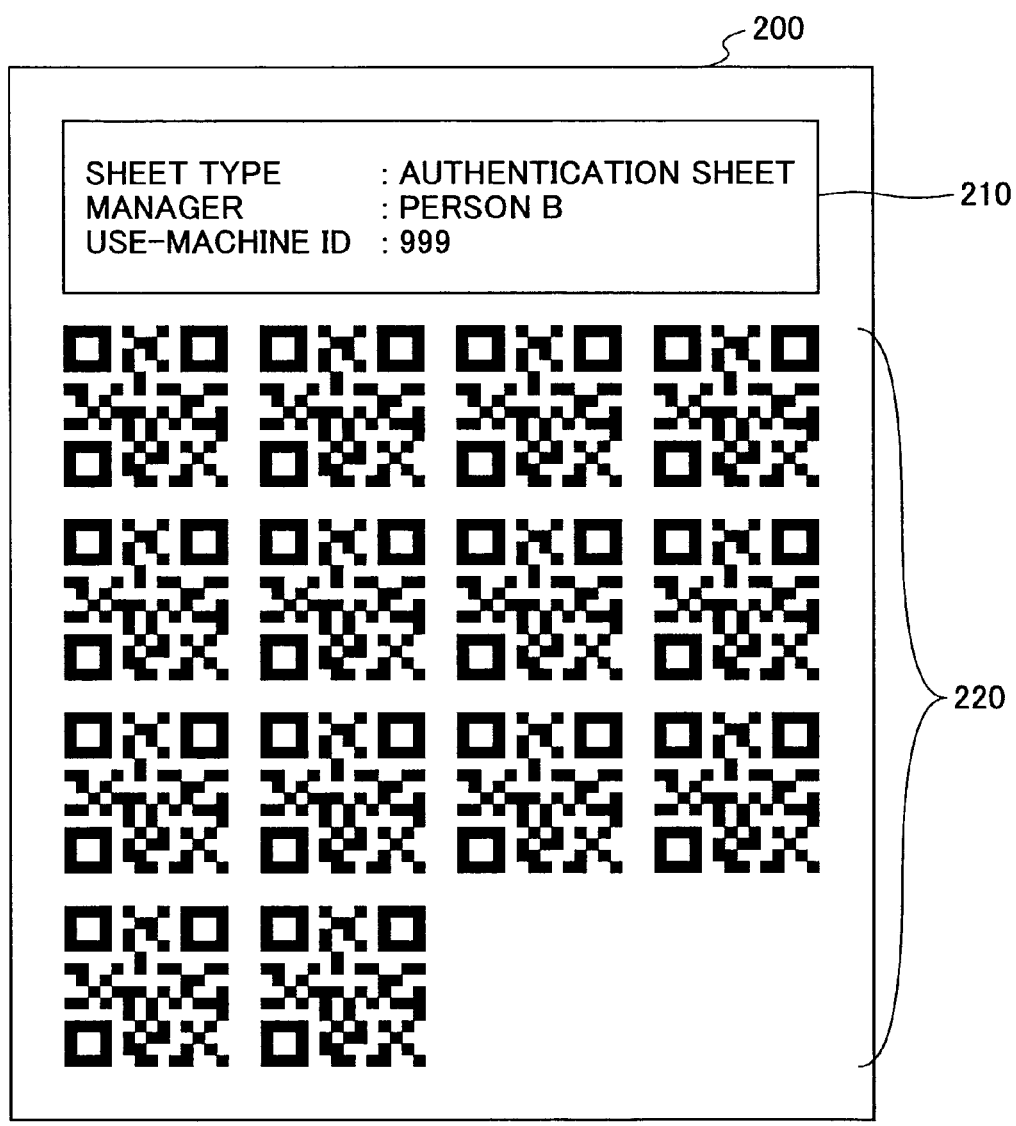
FIG. 4 is a diagram showing an example of an authentication sheet.

FIG. 4 is a diagram showing an example of the authentication sheet. The authentication sheet 200 in FIG. 4 includes a header section 210 and a data section 220.

In the header section 210, a part of embedded data in the authentication sheet 200 is recorded in such a manner as to be understood by a person. In an example in FIG. 4, a sheet type, a manager, and a use-machine ID are contained in the header section 210. The manager is the manager of the authentication sheet 200 and refers to a concept different from the owner (valid user) of the authentication sheet 200. Therefore, both the manager and the owner of the authentication sheet are not necessarily the same. For example, the manager of the authentication sheet 200 is "person B" in FIG. 4, but the owner of the authentication sheet 200 may be person A. The use-machine ID is the identification information (machine ID) of the image forming apparatus 10 that permits the user to use the authentication sheet 200. That is, the authentication sheet 200 is valid only in the image forming apparatus 10 identified by the use-machine ID. Note that items are arbitrarily displayed in the header section 210.

The data section 220 represents the substance of the embedded data in the authentication sheet 200. In FIG. 4, the embedded data are recorded in the form of QR codes, but they may be recorded in other forms (such as bar codes, patterns, and character strings in which the embedded data are encoded). Note that the same QR codes are arranged in FIG. 4, but they are for the sake of convenience. However, in order to prevent a scanning error, the same QR codes, the same QR code groups, or the like may be repeatedly recorded.

Then, the user presses a start button (scanning start button) on the operations panel 16 when the paper authentication available screen is displayed (S107). When the start button is pressed by the user, the local UI unit 121 requests the paper authentication management part 131 to execute login processing (S108) and switches a display screen on the operations panel 16 to a screen (scanning screen) indicating that scanning is being performed (S109).

Next, the paper authentication management part 131 requests the scanner control unit 122 to start (execute) scanning (S109). Then, the scanner control unit 122 causes the scanner to execute the scanning of image data from the authentication sheet and inputs the scanned image data (scanned image) to the paper authentication management part 131 (S110). Next, the paper authentication management part 131 inputs the scanned image to the authentication paper analysis part 134 and requests the authentication paper analysis part 134 to acquire the authentication information (S112). The authentication paper analysis part 134 acquires (extracts) the authentication information from the scanned image (S113) and returns an acquisition result of the authentication information to the paper authentication management part 131 (S114).

Then, the paper authentication management part 131 determines the success or failure of the acquisition of the authentication information by referring to the acquisition result (S115). If the acquisition of the authentication information is successful, the acquisition result contains the authentication information. If the acquisition of the authentication information fails, the acquisition result contains information indicating a reason why the acquisition of the authentication information fails. Accordingly, if the acquisition result contains the authentication information (YES in S115), the paper authentication management part 131 inputs the acquired authentication information to the authentication part 132 and requests the authentication part 132 to execute authentication (S116).

Next, the authentication part 132 notifies the local UI unit 121 of the start of the authentication (S117). In response to the notification, the local UI unit 121 displays on the operations panel 16 a screen (authenticating screen) indicating that the authentication is being performed (S118). Then, the authentication part 132 executes authentication processing by using the authentication information (S119). If the authentication is successful (S120), the authentication part 132 withdraws restrictions on using the application 124 (S121). Thus, the application 124 is made available. On the other hand, if the authentication fails, the restrictions on using the application 124 are not withdrawn. Accordingly, the user cannot use the application 124. Then, the authentication part 132 returns an authentication result (information indicating the success or failure of the authentication) to the paper authentication management part 131 (S122).

Next, the paper authentication management part 131 determines the success or failure of the login based on the authentication result (S123). The success or failure of the authentication directly leads to the success or failure of the login. Accordingly, in the case of the failure of the acquisition of the authentication information (NO in S123), the paper authentication management part 131 determines that the login has failed.

In the case of the failure of the login (NO in S123), the paper authentication management part 131 notifies the local UI unit 121 of the failure of the login (S124). In response to the notification, the local UI unit 121 displays on the operations panel 16 a screen (login failure screen) indicating that the login has failed (S125). Note that the authentication sheet request screen may be displayed to urge the user to reset the authentication sheet after the elapse of a certain period of time.

On the other hand, in the case of the success of the login (YES in S123), the paper authentication management part 131 notifies the local UI unit 121 of the success of the login (S126). In response to the notification, the local UI unit 121 displays on the operations panel 16 a screen (application use screen) for using the application 124 (S127). After this, when the user requests the execution of a job through the application use screen, the local UI section 121 requests the application 124 to execute the job. The application 124 executes the job if the restrictions on using the application are withdrawn.

Figure 5:
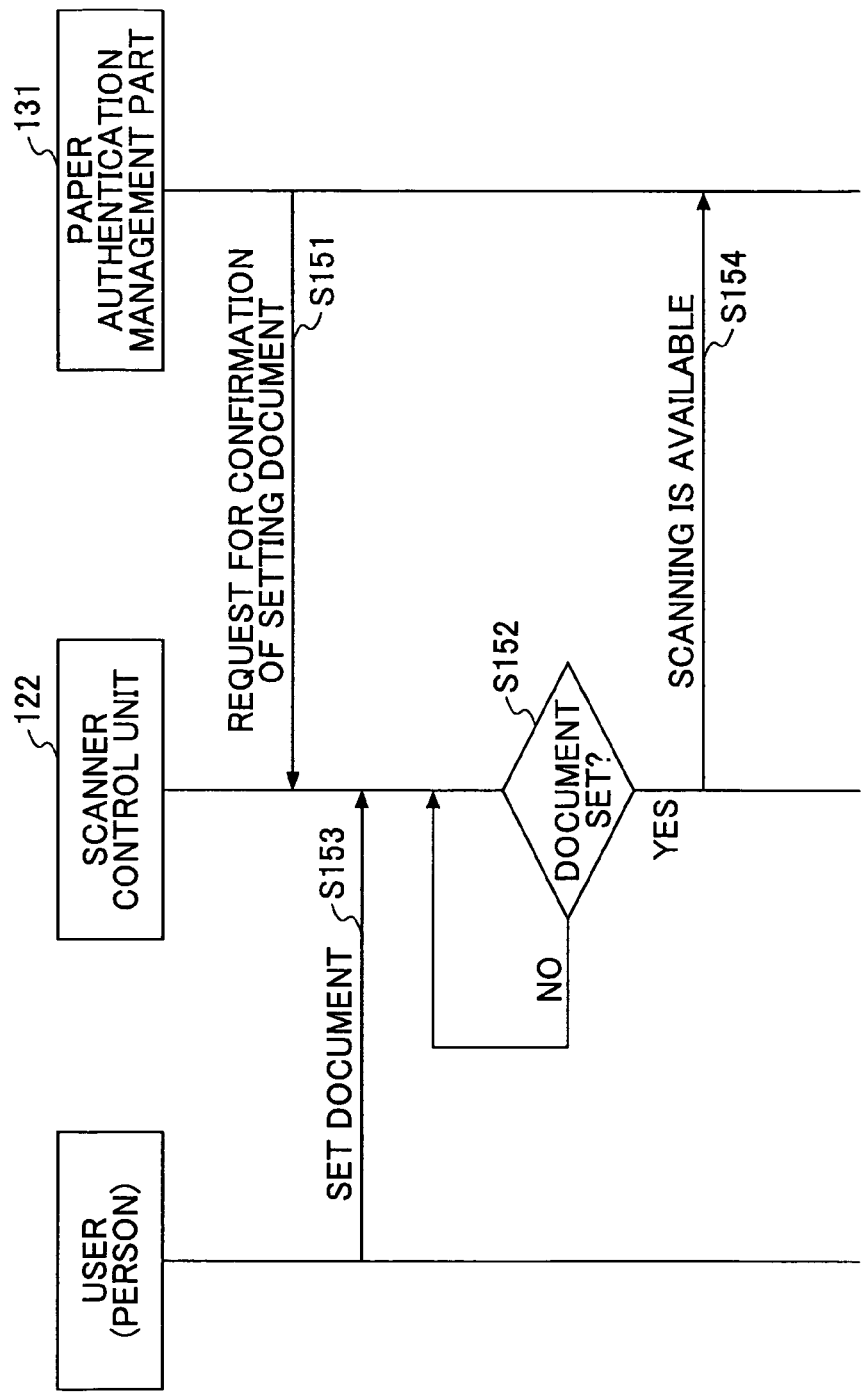
FIG. 5 is a sequence diagram for explaining the processing procedure of scanning preparation processing.

Here, step S104 (scanning preparation processing) is specifically described. FIG. 5 is a sequence diagram for explaining the processing procedure of the scanning preparation processing.

In step S151, the paper authentication management part 131 requests the scanner control unit 122 to confirm whether a document (authentication sheet) is set on the scanner 12. In response to the request, the scanner control unit 122 is in a standby status until the document is set on the scanner 12 (S152). When the user sets the document in the scanner 12 (S153), the scanner control unit 122 detects the setting of the document (YES in S152). After detecting the setting of the document, the scanner control unit 122 notifies the paper authentication management part 131 of the fact that scanning is available (S154).

Figure 6:
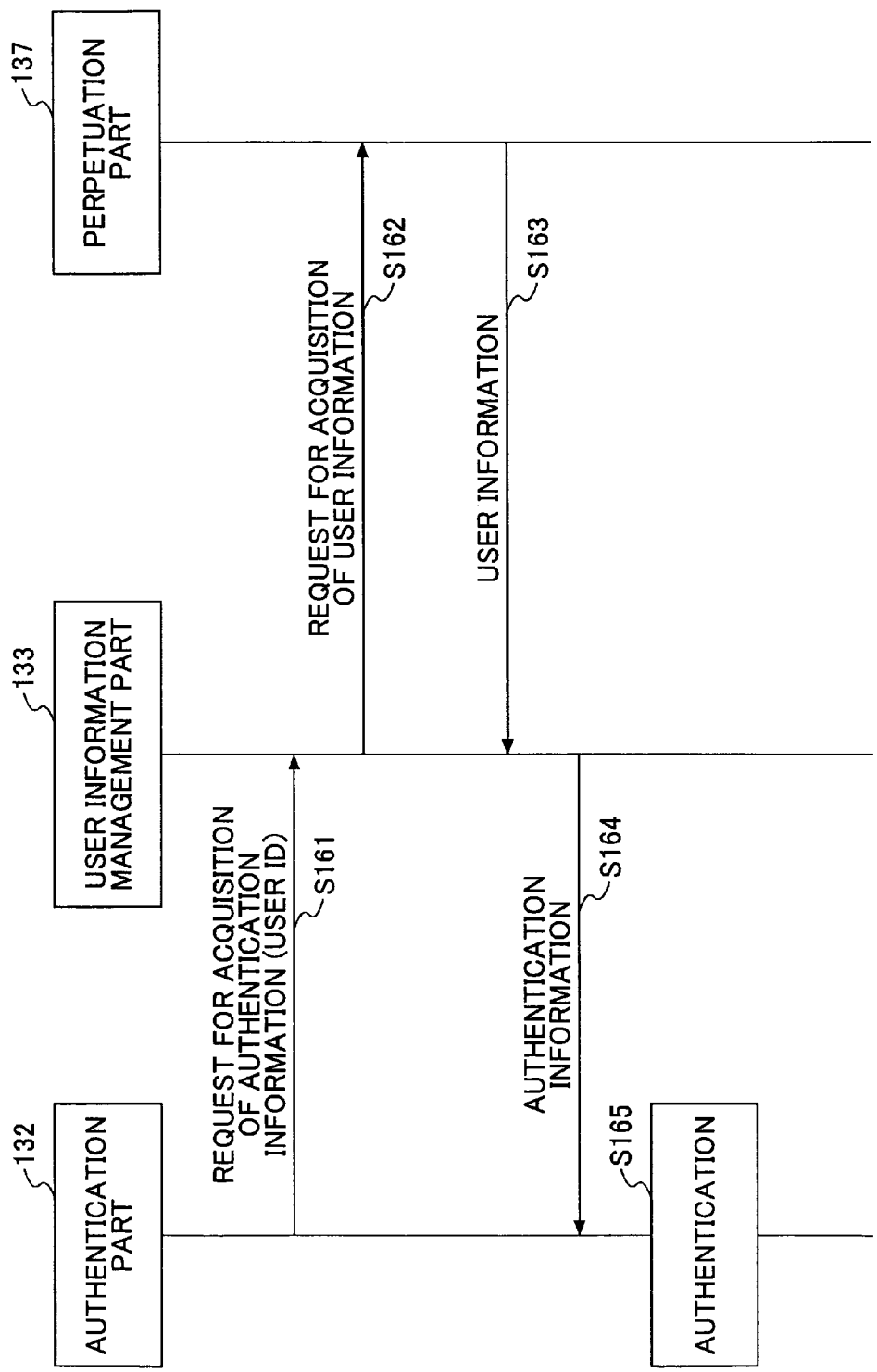
FIG. 6 is a sequence diagram for explaining the processing procedure of the authentication processing.

Next, step S119 (authentication processing) in FIG. 3 is specifically described. FIG. 6 is a sequence diagram for explaining the processing procedure of the authentication processing.

In step S161, the authentication part 132 specifies a user ID contained in the authentication information acquired from the authentication sheet and requests the user information management part 133 to acquire the authentication information to be verified (S161). The user information management part 133 acquires user information corresponding to the user ID from the perpetuation part 137 (S163). Then, the user information management part 133 acquires the authentication information from the acquired user information and returns the same to the authentication part 132 (S164). Next, the authentication part 132 performs the authentication by verifying the authentication information acquired from the authentication sheet with the authentication information acquired from the user information (S165). If they completely match with each other, the authentication part 132 determines that the authentication is successful. If they do not completely match with each other, the authentication part 132 determines that the authentication fails.

Here, step S113 (processing for acquiring the authentication information from the authentication sheet) in FIG. 3 is specifically described. Prior to the description of the processing procedure of the processing, a configuration example of data (hereinafter referred to as "authentication sheet data") recorded in the data section 220 of the authentication sheet 200 is described.

Figure 7:
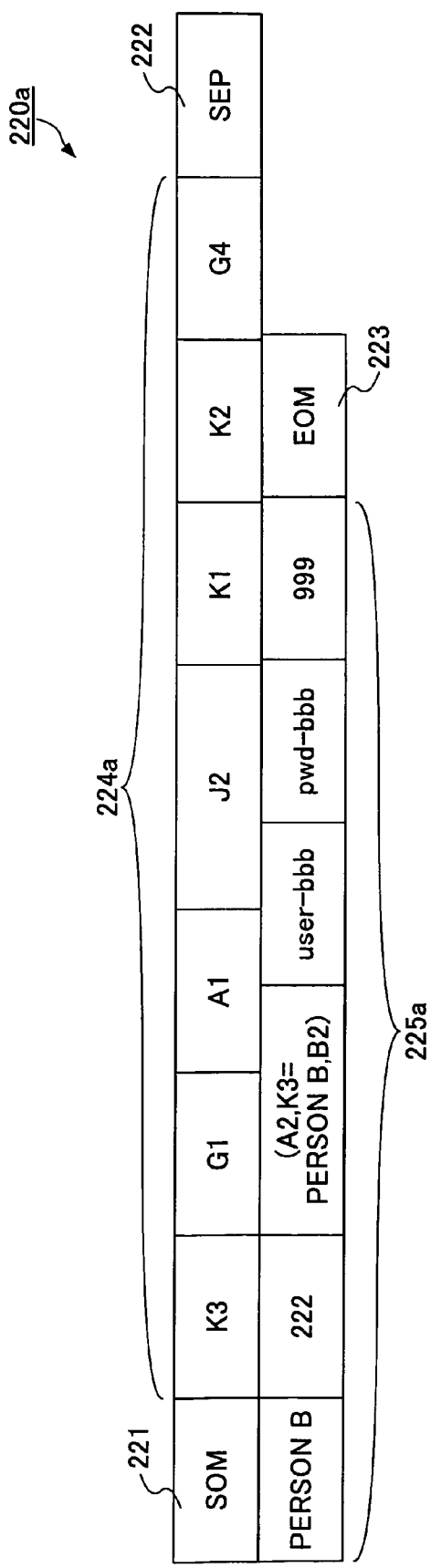
FIG. 7 is a diagram showing a configuration example of authentication sheet data.

FIG. 7 is a diagram showing the configuration example of the authentication sheet data. In FIG. 7, the authentication sheet data 220*a* have a SOM (Start Of Mark) 221, a SEP (Separator) 222, an EOM (End Of Mark) 223, a header section 224*a*, a data section 225*a*, and the like. An area between the SOM 221 and the SEP 222 is recognized as the header section 224a, and an area between the SEP 222 and the EOM 223 is recognized as the data section 225a.

In the header section 224a, the configuration of data items recorded in the data section 225a is defined. That is, the configuration of the data items recorded in the data section 225a can be varied according to the definition contents of the header section 224a. In the header section 224a in FIG. 7, K3, G1, A1, J2, K1, K2, and G4 are recorded. One symbol (hereinafter referred to as an "item identifier") composed of one alphabetic character and one number corresponds to one data item. The meaning of each item identifier is defined in an embedded-data definition table.

FIG. 8 is a diagram showing an example of the embedded-data definition table. In FIG. 8, the embedded-data definition table 400 contains information pieces defining the meanings of the item identifiers used in the authentication sheet data, which are, for example, recorded in the HDD 114 and managed by the perpetuation part 137.

Each column in the embedded-data definition table 400 corresponds to the first (alphabetic) character of the item identifier and indicates the type of a data item. Each line in the embedded-data definition table 400 corresponds to the second (numeric) character of the item identifier and indicates a value that could be taken as the type of the data item.

In an example in FIG. 8, "A" indicates a sheet type. As the sheet type, an authentication sheet (A1) and a personal identification sheet (A2) are defined. The personal identification sheet is a recording medium similar in form to the authentication sheet, the details of which are described below. The definition contents of the embedded-data definition table 400 are commonly used in both the authentication sheet and the personal identification sheet. In the following description, the authentication sheet and the personal identification sheet are referred simply to as "sheets" when they are collectively called.

"B" indicates a position (setting position) at which the sheet should be set at the time of scanning. As the setting position of the sheet, a platen (B1) and an ADF (Auto Document Feeder) (B2) are defined. "C" indicates a direction in which the sheet should be set at the time of scanning. As the direction of the sheet, a vertical direction (C1) and a horizontal direction (C2) are defined. "D" indicates a sheet size. As the size of the sheet, A4 (D1), B5 (D2), and A5 (D3) are defined. "E" indicates a sheet material. As the material of the sheet, a sheet (E1) and an OHP (E2) are defined. "G" indicates a sheet ID. As the sheet ID of the sheet, a publisher ID (G1), a user ID (G2), a publication-machine ID (G3), and a use-machine ID (G4) are defined. The publisher ID is the user ID of the publisher of the sheet. The user ID is a user ID with which the user is permitted to use the sheet. The publication-machine ID is the machine ID of the image forming apparatus 10 that publishes (generates) the sheet. The use-machine ID is the machine ID of the image forming apparatus 10 that permits the user to use the sheet.

"H" indicates the data form of embedded data in the sheet. As the data form of embedded data, a QR code (H1) and a bar code (H2) are defined. "J" indicates a personal identification method. The personal identification method is a method for identifying the user of the authentication sheet (owner of the authentication sheet, i.e., the authorized user of the authentication sheet). As the personal identification method for identifying the user of the authentication sheet, "no identification (J1)," "AND combination (J2)," "OR combination (J3)," and "manual input of a PIN (Personal Identification Number)" are defined. AND combination is a method for identifying the user of the authentication sheet by the logical product of plural conditions. OR combination is a method for identifying the user of the authentication sheet by the logical sum of plural conditions. Manual input of a PIN is a method for identifying the user of the authentication sheet by inputting a PIN. Note that if the personal identification method is J2 or J3, the personal identification sheet is used.

"K" indicates the authentication information. That is, the authentication information is information used for the authentication processing by the authentication part 132. As the authentication information for the authentication processing, a user ID (K1), a password (K2), a manager's name (K3), and a PIN (K4) are defined. "M" indicates a sheet color. As the sheet color of the sheet, black and white (M1) and color (M2), for example, are defined.

The contents of the authentication sheet data 220 in FIG. 7 are described below based on the embedded-data definition table 400. As described above, the header section 224a of the authentication sheet data 220a is composed of K3, G1, A1, J2, K1, K2, and G4. It is found from K3 that a manager's name (person B) is recorded in the first item of the data section 225a. It is found from G1 that a publisher ID (222) is recorded in the second item of the data section 225a. It is found from A1 that the sheet is the authentication sheet. Note that data corresponding to the type A do not exist in the data section 225a.

It is found from J2 that the method for identifying the user of the authentication sheet is based on AND combination and the third item of the data section 225a defines the conditions of AND combination. In the third item of the data section 225a, (A2, K3=person B, B2) is recorded. This indicates the logical product of three conditions including A2, K3=person B, and B2. That is, it is determined that the personal identification is successful provided that the personal identification is performed using the personal identification sheet (A2), the manager's name (K3) of the personal identification sheet is person B, and the personal identification sheet is set on the ADF (B2).

It is found from K1 that a user ID (user-bbb) is recorded in the fourth item of the data section 225a. It is found from K2 that a password (pwd-bbb) is recorded in the fifth item of the data section 225a. It is found from G4 that a use-machine ID (999) is recorded in the sixth item of the data section 225a.

Based on the above, the processing (S113 in FIG. 3) for acquiring the authentication information from the authentication sheet is described. FIG. 9 is a sequence diagram for explaining the processing procedure of the processing for acquiring the authentication information from the authentication sheet. The following description is based on the premise that the authentication sheet data 220a in FIG. 7 is recorded in the authentication sheet.

In step S201, the authentication paper analysis part 134 inputs a scanned image to the embedded-data analysis part 135 and requests the embedded-data analysis part 135 to acquire a sheet type from the scanned image. Next, the embedded-data analysis part 135 extracts the authentication sheet data 220a from the QR codes included in the scanned image and acquires the sheet type from the authentication sheet data 220a (S202). More specifically, the embedded-data analysis part 135 retrieves an item identifier An (where n is 1 or 2) indicating the sheet type from the header section 224a of the authentication sheet data 220a. Note that the embedded-data analysis part 135 stores the read authentication sheet data 220a in the RAM 112 for the subsequent processing.

Then, the embedded-data analysis part 135 returns the acquired sheet type to the authentication paper analysis part 134 (S203). The authentication paper analysis part 134 confirms whether the sheet type indicates the authentication sheet (S204). If the sheet type does not indicate the authentication sheet (NO in S204), the authentication paper analysis part 134 returns information to the paper authentication information management part 131 as an acquisition result in step S114, indicating that the acquisition of the authentication information has failed due to an abnormality in the sheet.

If the sheet type indicates the authentication sheet (YES in S204), the authentication paper analysis part 134 requests the embedded-data analysis part 135 to extract the authentication information from the authentication sheet (S206). Next, the embedded-data analysis part 135 executes processing for extracting the authentication information from the authentication sheet data 220*a* stored in the RAM 112 (S207) and returns an extraction result of the authentication information to the authentication paper analysis part 134 (S208). If the extraction of the authentication information is successful, the extraction result contains the authentication information. If the extraction of the authentication information fails, the extraction result contains information indicating a reason why the extraction of the authentication information fails. Then, the authentication paper analysis part 134 returns the extraction result to the paper authentication information management part 131 as an acquisition result in step S114 (S209).

Figure 10B:
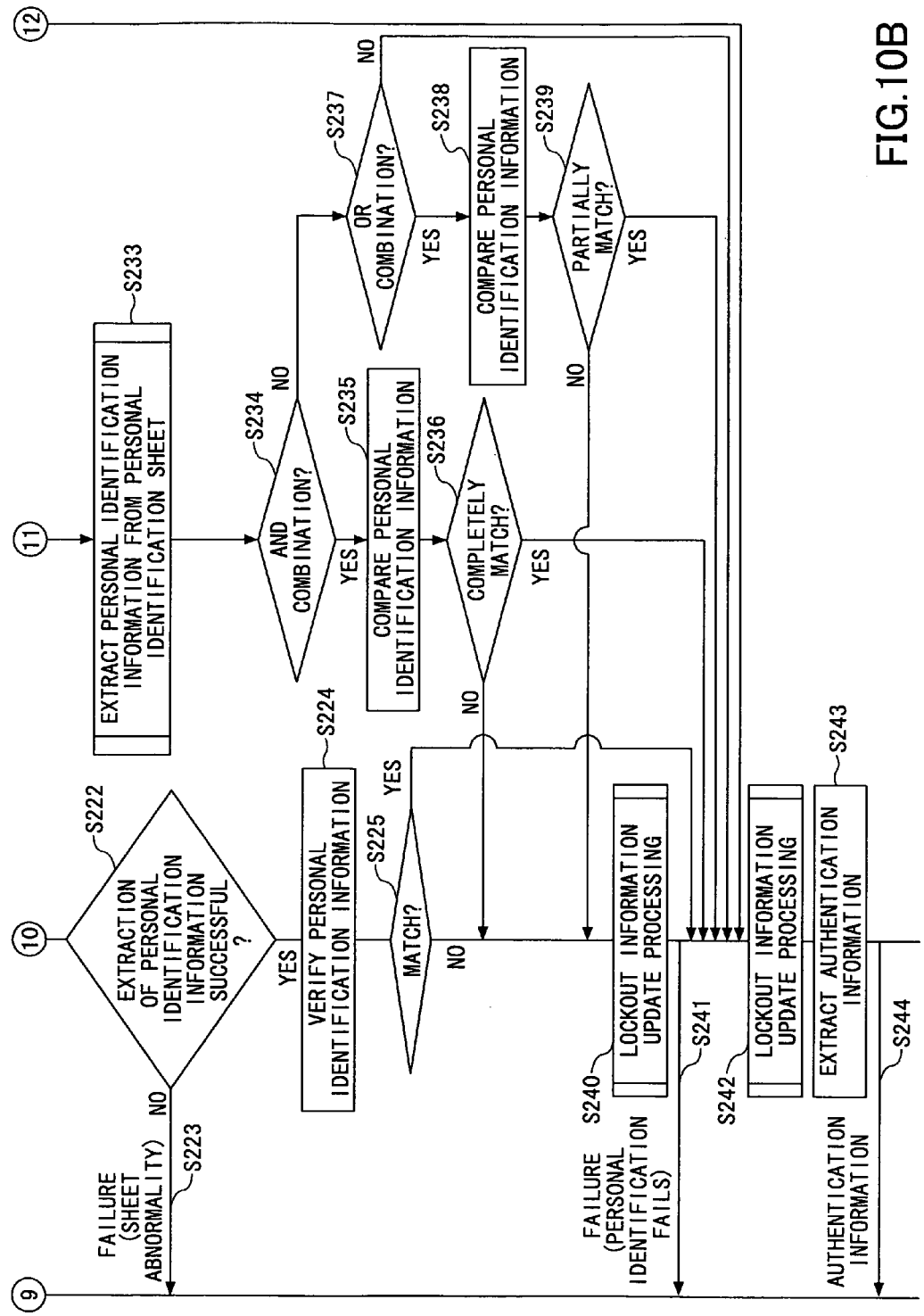

Here, step S207 (authentication information extraction processing) is specifically described. FIG. 10 is a sequence diagram for explaining the processing procedure of the authentication information extraction processing.

In step S211, the embedded-data analysis part 135 extracts a sheet ID from the authentication sheet data 220*a* stored in the RAM 112 (S211). Specifically, the embedded-data analysis part 135 determines what position of the data section 225*a* the sheet ID is recorded by retrieving an item identifier Gn (where n is any one of 1 through 4) indicating the sheet ID from the header section 224*a* of the authentication sheet data 220*a*, and acquires the sheet ID from the data section 225*a* based on a determination result. Note that the extraction of other data items from the authentication sheet data 220*a* as described below is performed in the same manner.

Next, the embedded-data analysis part 135 executes processing for acquiring the lockout information of the authentication sheet based on the sheet ID (S212).

FIG. 11 is a diagram showing a configuration example of the lockout information. In FIG. 11, the lockout information contains information such as a sheet ID, the number of personal identification failure times, and a lockout time limit.

The sheet ID is a sheet ID associated with the lockout information. That is, the lockout information is generated on a sheet ID basis. Accordingly, the authentication sheets having the same sheet ID are locked out at the same time. The number of personal identification failure times is the number of times where personal identification for the authentication sheet corresponding to the sheet ID has failed. The lockout time limit is the lockout time limit of the authentication sheet corresponding to the sheet ID. After the lockout time limit has elapsed, the authentication sheet becomes free from being locked out and is made available (valid).

Then, the embedded-data analysis part 135 acquires the lockout policy of the authentication sheet (S213). The lockout policy is information defining a condition or the like for locking out the authentication sheet, which is, for example, recorded in the HDD 114 and managed by the perpetuation unit 137.

FIG. 12 is a diagram showing a configuration example of the lockout policy. In FIG. 12, the lockout policy 510 contains information such as an object to be locked out, a lockout condition, and a lockout duration.

The object to be locked out is the type of the sheet to be locked out based on the lockout policy 510. In FIG. 12, the value of the object to be locked out is the authentication sheet. Accordingly, it can be found that the lockout policy 510 in FIG. 12 is directed for the authentication sheet. The lockout condition is a condition for locking out the authentication sheet. In FIG. 12, it is defined that the authentication sheet is locked out if the personal identification fails three times. The lockout duration is a period at which the authentication sheet is locked out. In FIG. 12, it is defined that the authentication sheet is locked out for 60 minutes.

Next, the embedded-data analysis part 135 determines whether the authentication sheet is being locked out based on the lockout information and the lockout policy 510 (S214). Specifically, if the number of personal identification failure times of the lockout information exceeds the value set in the lockout condition of the lockout policy 510 and if the lockout time limit of the lockout information is not expired at this time, it is determined that the authentication sheet is being locked out. Otherwise, it is determined that the authentication sheet is not being locked out.

If the authentication sheet is being locked out (YES in S214), the embedded-data analysis part 135 returns information to the authentication paper analysis part 134 as an extraction result in step S208 (S215), indicating that the extraction of the authentication information has failed because the authentication sheet is being locked out.

If the authentication sheet is not being locked out (NO in S214), the embedded-data analysis part 135 confirms whether personal identification for the authentication sheet is required. Specifically, the embedded-data analysis part 135 determines whether the value of the personal identification method in the header section 224*a* of the authentication sheet data 220*a* is J1 (no identification) (S216). If the value of the personal identification method is J1 or if the personal identification method is not recorded in the authentication sheet data 220*a*, the embedded-data analysis part 135 determines that the personal identification is not required. If the personal identification method is recorded in the authentication sheet data 220*a* and the value of the personal identification method is any one of J2 (AND combination), J3 (OR combination), and J4 (manual input of a PIN), the embedded-data analysis part 135 determines that the personal identification is required.

Note that the personal identification can be compared to a key locked to extract the authentication information from the authentication sheet. That is, if the personal identification is not required, the extraction of the authentication information from the authentication sheet is not locked. On the other hand, if the personal identification is required, the extraction of the authentication information from the authentication sheet is locked. If the extraction of the authentication information from the authentication sheet is locked, processing for inputting a key indicating an identity is required. In this embodiment, this key is called personal identification information.

Then, the embedded-data analysis part 135 determines whether the value of the personal identification method of the authentication sheet data 220*a* is J4 (manual input of a PIN) (S219). If the value of the personal identification method is the manual input of a PIN (YES in S219), the embedded-data analysis part 135 controls the execution of processing that causes the user to input a PIN as the personal identification information (S220). Specifically, the embedded-data analysis part 135 causes the local UI unit 121 to display on the operations panel 16 a screen for inputting a PIN and acquires the PIN input by the user through the screen from the local UI unit 121.

Figure 13:
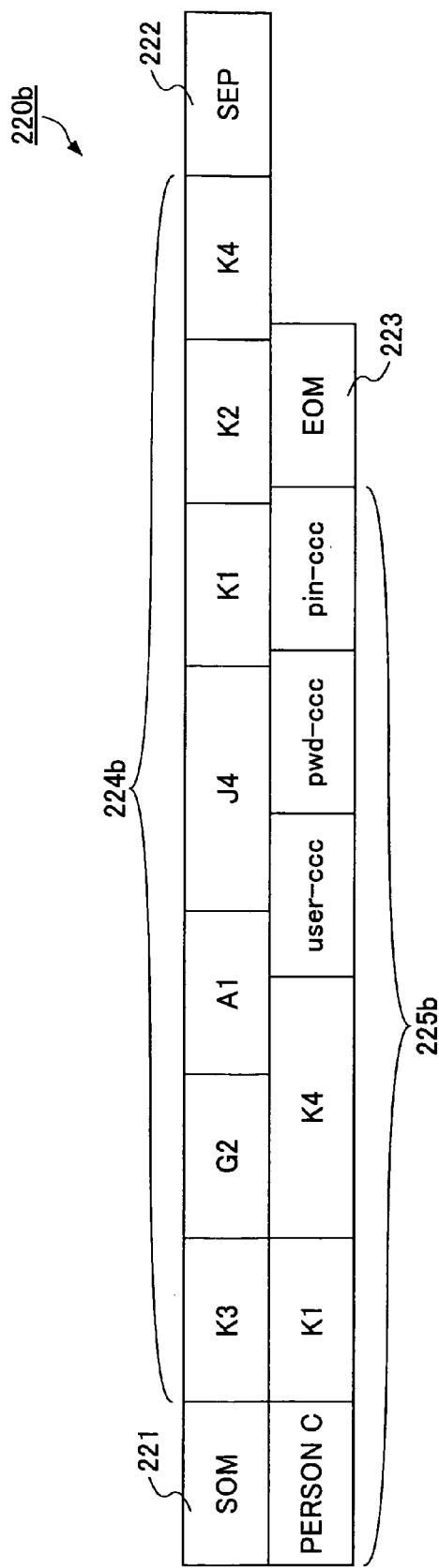
FIG. 13 is a diagram showing an example of the authentication sheet data where a personal identification method is manual input of a PIN.

FIG. 13 is a diagram showing an example of the authentication sheet data where the personal identification method is the manual input of a PIN. In FIG. 13, the value of the fourth item of the header section 224b of the authentication sheet data 220b is J4. Accordingly, this indicates that the personal identification method for the authentication sheet related to the authentication sheet data 220b is to input a PIN. Note that in each step in the case of YES in step S219, the authentication sheet data 220b in FIG. 13 is processed for the sake of convenience.

Next, the embedded-data analysis part 135 extracts information (hereinafter referred to as "personal identification verification information") to be verified with the personal identification information from the authentication sheet data 220b. The personal identification verification information corresponds to the PIN recorded in the authentication sheet data 220b (S221). In the header section 224b, K4 representing a PIN is recorded at the tail end. Accordingly, a value (999) at the tail end of the data section 225b is extracted as the personal identification verification information.

Then, the embedded-data analysis part 135 determines the success or failure of the extraction of the personal identification verification information (S222). If the extraction of the personal identification verification information fails as in a case where the personal identification verification information is not recorded in the authentication sheet data 220b (NO in S222), the embedded-data analysis part 135 returns information to the authentication paper analysis part 134 as an extraction result in step S208 (FIG. 9) (S223), indicating that the extraction of the authentication information has failed due to an abnormality in the authentication sheet.

If the extraction of the personal identification verification information is successful (YES in S222), the embedded-data analysis part 135 verifies the personal identification information (PIN) input by the user with the personal identification verification information (S224). If they do not match with each other (NO in S225), the embedded-data analysis part 135 executes processing for updating the lockout information based on the failure of the personal identification (S240). Next, the embedded-data analysis part 135 returns information to the authentication paper analysis part 134 as an extraction result in step S208 (FIG. 9) (S241), indicating that the extraction of the authentication information has failed due to the failure of the personal identification.

If they match with each other (YES in S225), the embedded-data analysis part 135 executes the processing for updating the lockout information based on the success of the personal identification (S242). Then, the embedded-data analysis part 135 extracts a user ID (K1) and a password (K2) as the authentication information from the authentication sheet data 220b (S243). Next, the embedded-data analysis part 135 returns the extracted authentication information to the authentication paper analysis part 134 as an extraction result in step S208 (FIG. 9) (S244).

On the other hand, in the case of NO in step S219 (NO in S219) (i.e., if the personal identification method is any one of J2 (AND combination) and J3 (OR combination)), the embedded-data analysis part 135 extracts the conditions of the personal identification method from the data section 225b of the authentication sheet data 220a (S231). Note that in this case, the extracted conditions ("A2, K3=person B, B2") constitute the personal identification verification information.

Then, the embedded-data analysis part 135 controls the execution of the processing for extracting the personal identification information from the personal identification sheet (S233). After the personal identification information is extracted from the personal identification sheet, the embedded-data analysis part 135 determines whether the personal identification method is AND combination (J2) (S234).

If the personal identification method is AND combination (YES in S234), the embedded-data analysis part 135 verifies the personal identification information extracted from the personal identification sheet with the personal identification verification information extracted from the authentication sheet (S235). If they do not completely match with each other (NO in S236), the embedded-data analysis part 135 executes steps S240 and S241 described above.

If they completely match with each other (YES in S236), the embedded-data analysis part 135 executes steps S242 through S244 described above. Note that if they completely match with each other, all the conditions included in the personal identification verification information are met. If the manager's name extracted from the personal identification sheet is person B and the personal identification sheet is set on the ADF at the time of scanning provided that the extracted conditions include (A2, K3=person B, B2), it is determined that they completely match with each other.

On the other hand, if the personal identification method is OR combination (NO in S234), the embedded-data analysis part 135 verifies the personal identification information extracted from the personal identification sheet with the personal identification verification information extracted from the authentication sheet (S238). If they do not even partially match with each other (NO in S239), the embedded-data analysis part 135 executes steps S240 and S241 described above.

If they at least partially match with each other (YES in S239), the embedded-data analysis part 135 executes steps S242 through S244 described above. Note that if they at least partially match with each other, any one of the conditions included in the personal identification verification information is met. If the manager's name extracted from the personal identification sheet is person B or if the personal identification sheet is set on the ADF at the time of scanning provided that the extracted conditions include (A2, K3=person B, B2), it is determined that they at least partially match with each other.

Note that in the case of NO in step S216 (i.e., if the personal identification is not required), the embedded-data analysis part 135 executes steps S242 through S244 without performing the personal identification. For example, FIG. 14 is a diagram showing an example of the authentication sheet data that do not require the personal identification.

Figure 14:
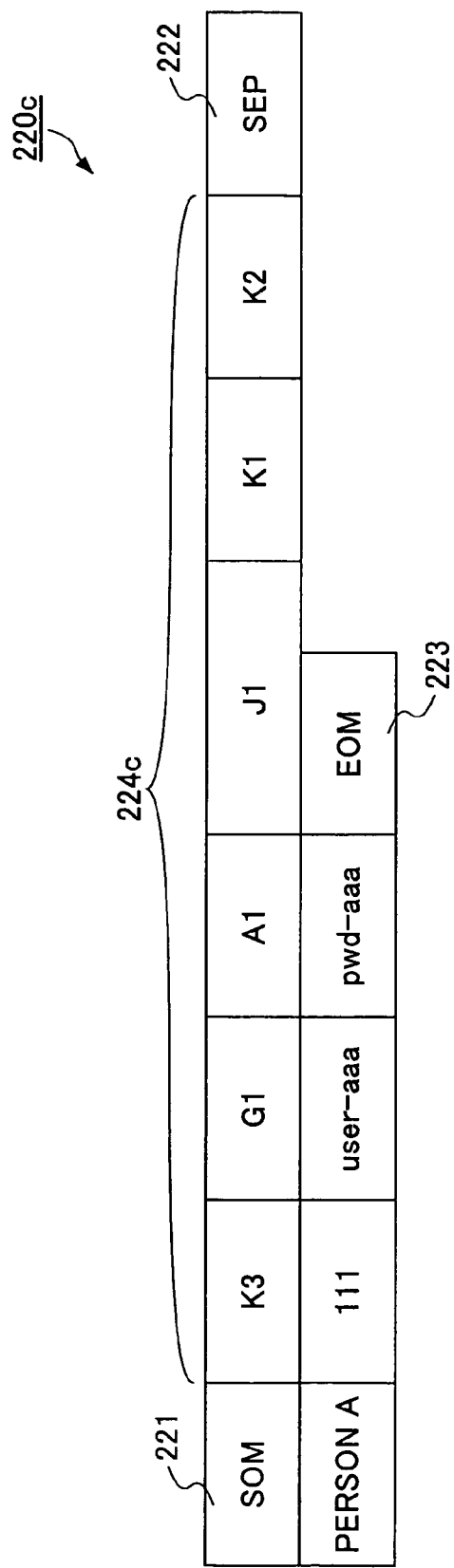
FIG. 14 is a diagram showing an example of the authentication sheet data that do not require personal identification.

In FIG. 14, the value of the fourth item of the header section 224c of the authentication sheet data 220c is J1. Accordingly, it can be found that the personal identification for the authentication sheet related to the authentication sheet data 220c is not required.

Figure 15A:
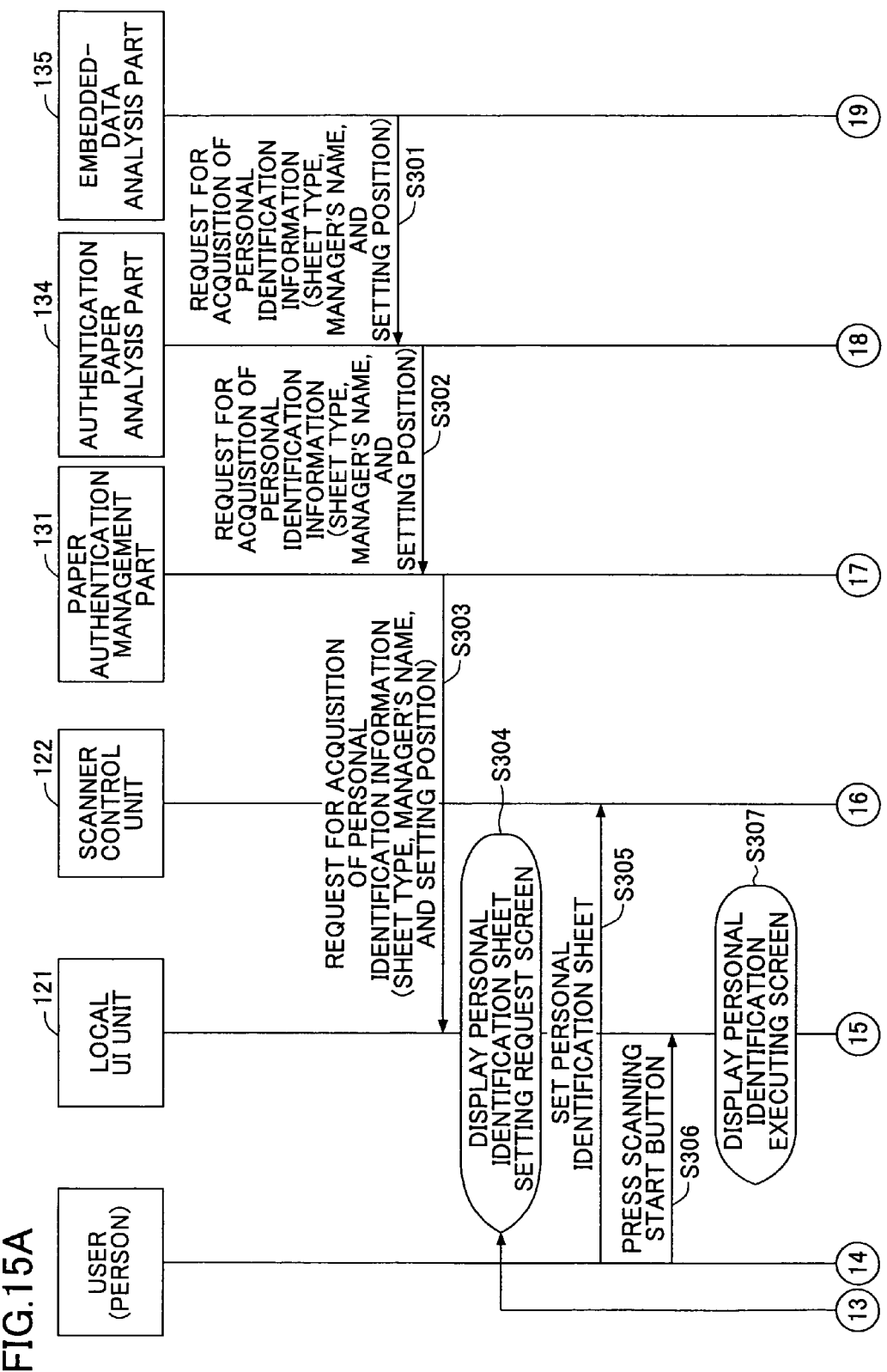
FIGS. 15A and 15B are sequence diagrams for explaining the processing procedure of processing for extracting personal identification information from a personal identification sheet.
Figure 15B:
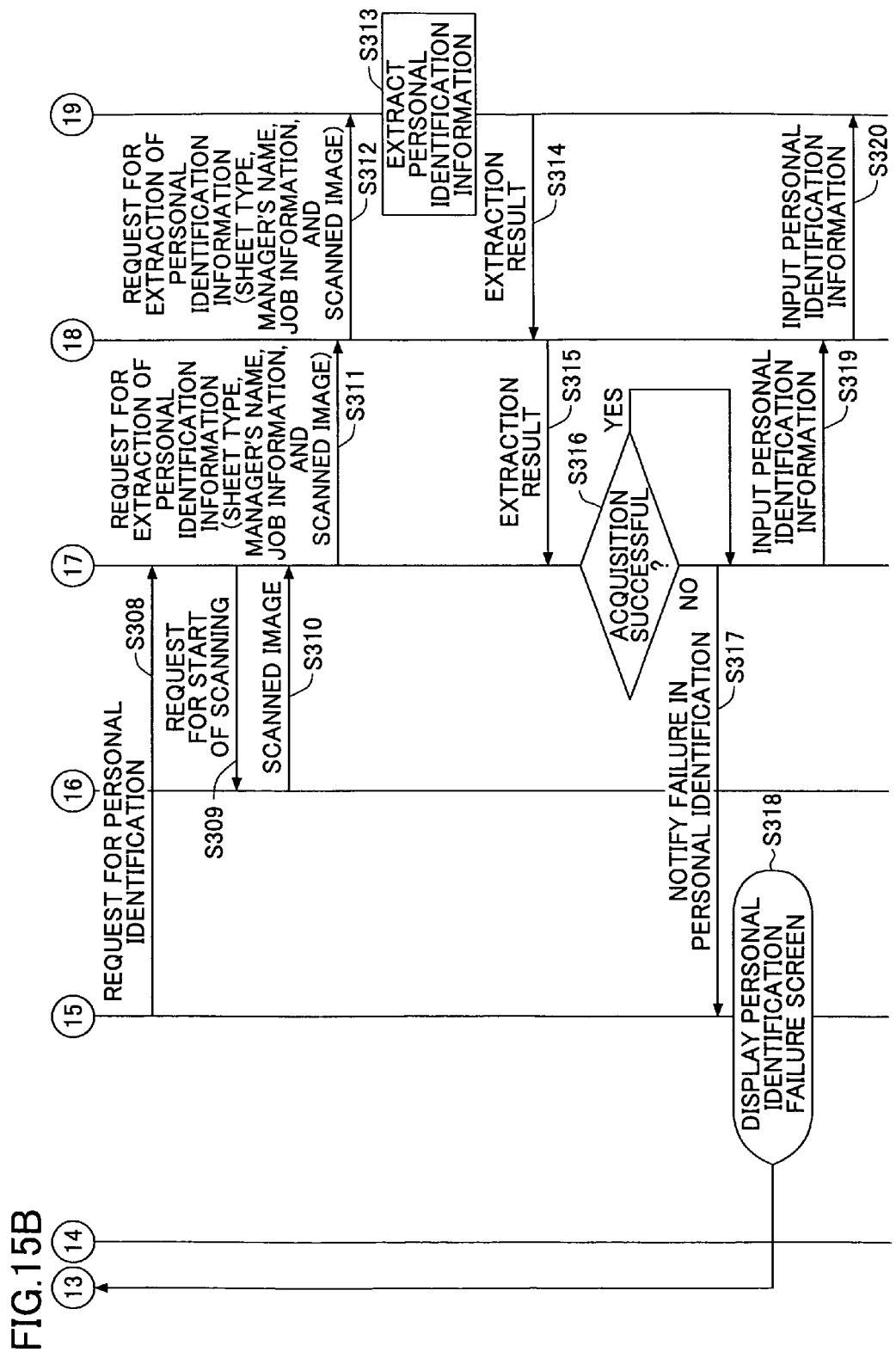

Next, step S233 (processing for extracting the personal identification information from the personal identification sheet) in FIG. 10 is specifically described. FIG. 15 is a sequence diagram for explaining the processing procedure of the processing for extracting the personal identification information from the personal identification sheet.

In step S301, the embedded-data analysis part 135 specifies conditions included in the personal identification verification information extracted from the authentication sheet and requests the authentication paper analysis part 134 to acquire the personal identification information. When the conditions are based on the authentication sheet data 220a (FIG. 7), a sheet type, a manager's name, and a setting position are specified. The request for the acquisition of the personal identification information is transmitted to the local UI unit 121 via the authentication paper analysis part 134 and the paper authentication management part 131 (S302 and S303).

Then, the local UI unit 121 displays on the operations panel 16 a screen requesting the setting of the personal identification sheet (personal identification sheet setting request screen) (S304). In response to the request for the setting of the personal identification sheet, the user sets his/her personal identification sheet in the scanner 12 (S305).

Figure 16:
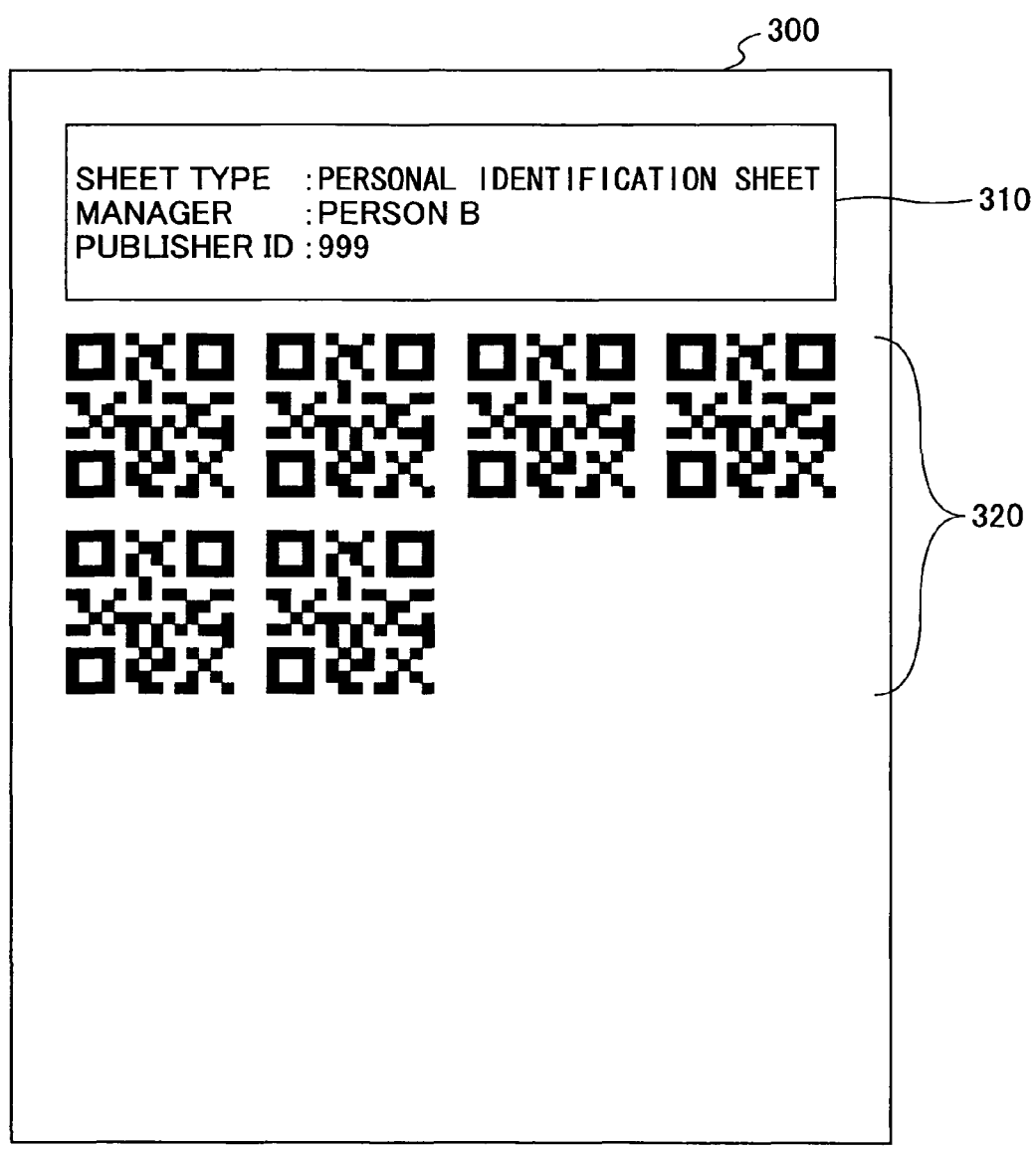
FIG. 16 is a diagram showing an example of the personal identification sheet.

FIG. 16 is a diagram showing an example of the personal identification sheet. The appearance of the personal identification sheet 300 in FIG. 16 is similar to the authentication 200 in FIG. 4.

That is, the personal identification sheet 300 includes a header section 310 and a data section 320. In the header section 310, a part of embedded data in the personal identification sheet 300 is recorded in such a manner as to be understood by a person. In an example in FIG. 16, a sheet type, a manager, and a publisher ID are contained in the header section 310. The manager is the manager of the personal identification sheet 300 and refers to a concept different from the owner of the personal identification sheet 300. Therefore, both the manager and the owner are not necessarily the same. The publisher ID is the user ID of the publisher of the personal identification sheet 300. Note that items are arbitrarily displayed in the header section 310.

The data section 320 represents the substance of the embedded data in the personal identification sheet 300. In FIG. 16, the embedded data are recorded in the form of QR codes, but they may be recorded in other forms. Note that the same QR codes are arranged in FIG. 16, but they are for the sake of convenience. However, in order to prevent a scanning error, the same QR codes, the same QR code groups, or the like may be repeatedly recorded.

Then, the user presses a start button (scanning start button) on the operations panel 16 (S306). When the start button is pressed by the user, the local UI unit 121 displays on the operations panel 16 a screen (personal identification executing screen) indicating that the personal identification is being executed (S307). Next, the local UI unit 121 requests the paper authentication management part 131 to execute the personal identification (S308).

Then, the paper authentication management part 131 requests the scanner control unit 122 to start (execute) scanning (S309). The scanner control unit 122 causes the scanner 122 to execute the scanning of image data from the personal identification sheet and inputs the scanned image data (scanned image) to the paper authentication management part 131 (S310). Note that the scanner control unit 122 inputs the attribute information (job information) of a scan job to the paper authentication management part 131 in addition to the scanned image. The job information contains information with which the setting position (platen or ADF) of the personal identification sheet can be identified.

Next, the paper authentication management part 131 inputs the job information and the scanned image to the authentication paper analysis part 134 and requests the authentication paper analysis part 134 to extract the personal identification information (S311). In this request, information indicating information (a sheet type, a manager's name, and a setting position) to be extracted as the personal identification information are also specified. Then, the authentication paper analysis part 134 transmits this request to the embedded-data analysis part 135 (S312). Next, the embedded-data analysis part 135 extracts the personal identification information from the scanned image and the job information (S313). Specifically, the sheet type and the manager's name are extracted from the scanned image (the data section 320 of the personal identification sheet 300), and the setting position is extracted from the job information.

Figure 17:
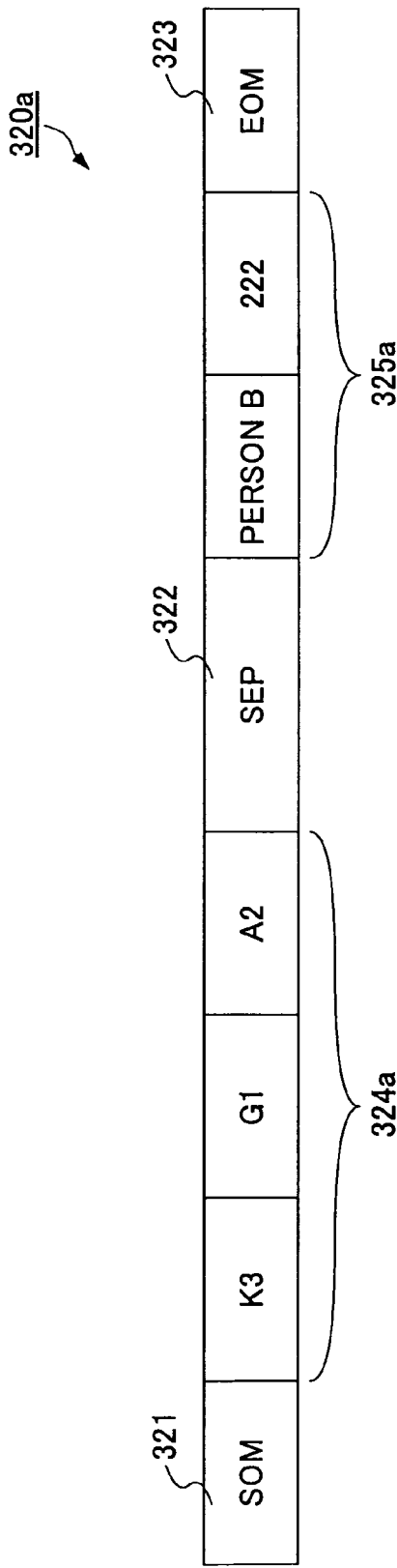
FIG. 17 is a diagram showing a configuration example of personal identification sheet data.

For example, in the data section 320 of the personal identification sheet 300, data (hereinafter referred to as "personal identification sheet data") shown in FIG. 17 are recorded. FIG. 17 is a diagram showing a configuration example of the personal identification sheet data.

In FIG. 17, the personal identification sheet data 320*a* has a SOM (Start Of Mark) 321, a SEP (Separator) 322, an EOM (End Of Mark) 323, a header section 324*a*, a data section 325*a*, and the like. An area between the SOM 321 and the SEP 322 is recognized as the header section 324*a*, and an area between the SEP 322 and the EOM 323 is recognized as the data section 325*a*.

In the header section 324*a*, the configuration of data items recorded in the data section 325*a* is defined by item identifiers. That is, the configuration of the data items recorded in the data section 325*a* can be varied according to the definition contents of the header section 324*a*. In the header section 324*a* in FIG. 17, K3, G1, and A2 are recorded. The meaning of each item identifier can be seen in FIG. 8.

Accordingly, it is found from K3 that a manager's name (person B) is recorded in the first item of the data section 325*a*. It is found from G1 that a publisher ID (222) is recorded in the second item of the data section 325*a*. It is found from A2 that the sheet is the personal identification sheet.

Thus, the embedded-data analysis part 135 extracts the personal identification sheet data 320*a* from the QR codes included in the scanned image and extracts the manager's name and the sheet type from the personal identification sheet data 320*a*.

Then, the embedded-data analysis part 135 returns an extraction result to the authentication paper analysis part 134 (S314). If the extraction of the personal identification information is successful, the extraction result includes the personal identification information such as a sheet type, a manager' name, and a setting position. If the extraction of the personal identification information fails, the extraction result includes a reason why the extraction of the personal identification information fails. Next, the authentication paper analysis part 134 returns the extraction result to the paper authentication management part 131 (S315).

Then, the paper authentication management part 131 determines the success or failure of the extraction of the personal identification information by referring to the extraction result (S316). If the extraction of the personal identification information fails (NO in S316), the paper authentication management part 131 notifies the local UI unit 121 of the fact that personal authentication fails (S317). The local UI unit 121 displays on the operations panel 16 a screen indicating that the personal identification fails (personal identification failure screen) (S318). Note that the personal identification sheet setting request screen may be displayed to urge the user to reset the personal identification sheet after the elapse of a certain period of time.

If the extraction of the personal identification information is successful (YES in S316), the paper authentication management part 131 inputs the personal identification information included in the extraction result to the authentication paper analysis part 134 (S319). Next, the authentication paper analysis part 134 inputs the personal identification information to the embedded-data analysis part 135 (S320). At this timing, the processing is restored to step S233 in FIG. 10.

Here, step S212 (lockout information acquisition processing) in FIG. 10 is specifically described. FIG. 18 is a sequence diagram for explaining the processing procedure of the lockout information acquisition processing.

In step S401, the embedded-data analysis part 135 specifies a sheet ID extracted from the authentication sheet and requests the lockout-information management part 136 to acquire the lockout information. The lockout-information management part 136 acquires the lockout information (lockout information that includes the specified sheet ID as the value of the "sheet ID") corresponding to the sheet ID from the perpetuation part 137 (S402 and S403).

If the lockout-information management part 136 acquires the lockout information corresponding to the sheet ID (YES in S404), it returns the acquired lockout information to the data analysis part 135 (S406). If the lockout-information management part does not acquire the lockout information corresponding to the sheet ID (NO in S404), it generates lockout information corresponding to the sheet ID and stores it in the perpetuation part 137 (S405). At this time, the number of personal identification failure times is regarded as "0," and the lockout time limit is "not set." Then, the lockout-information management part 136 returns the generated lockout information to the embedded-data analysis part 135 (S406).

Here, step S213 (lockout policy acquisition processing) in FIG. 10 is specifically described. FIG. 19 is a sequence diagram for explaining the processing procedure of the lockout policy acquisition processing.

In step S411, the embedded-data analysis part 135 requests the lockout-information management part 136 to acquire the lockout policy 510 of the authentication sheet (S411). The lockout-information management part 136 acquires the lockout policy 510 (lockout policy 510 that specifies the "authentication sheet" as the value of "an object to be locked out") corresponding to the authentication sheet from the perpetuation part 137 (S412 and S413). Then, the lockout-information management part 136 returns the acquired lockout policy 510 to the embedded-data analysis part 135 (S414).

Here, step S240 (lockout information update processing) in FIG. 10 is specifically described. FIG. 20 is a sequence diagram for explaining the processing procedure of the lockout information update processing.

In step S501, the embedded-data analysis part 135 specifies a sheet ID extracted from the authentication sheet and information indicating the success or failure of the personal identification and requests the lockout-information management part 136 to update the lockout information. Then, based on the lockout time limit of the lockout information (hereinafter referred to as "current lockout information") corresponding to the sheet ID, the lockout-information management part 136 determines whether the lockout of the authentication sheet can be cancelled (S502). Specifically, if the lockout time limit is expired at this time, it is determined that the lockout of the authentication sheet can be cancelled. Furthermore, if the lockout time limit is not expired at this time, it is determined that the lockout of the authentication sheet cannot be cancelled even though the personal identification is successful.

If the lockout of the authentication sheet cannot be cancelled (NO in S502), the lockout-information management part 136 returns information to the data analysis part 135 as a result of the lockout information update processing (S503), indicating that the authentication sheet is being locked out. In this case, the current lockout information is not updated.

If the lockout of the authentication sheet can be cancelled (YES in S502) and the failure of the personal identification is indicated by the embedded-data analysis part 135 (NO in S504), the lockout-information management part 136 adds 1 to the number of personal identification failure times of the current lockout information and writes the updated number of personal identification failure times in the perpetuated current lockout information (S505).

Next, the lockout-information management part 136 compares the updated number of personal identification failure times with the number of times specified in the lockout condition included in the lockout policy 510 to determine whether the authentication sheet should be locked out (S507). If the number of personal identification failure times exceeds the number of times specified in the lockout condition (YES in S507), the lockout-information management part 136 calculates the lockout time limit of the current lockout information and writes the calculated lockout time limit in the perpetuated current lockout information (S508). Note that the lockout time limit of the current lockout information is calculated by the addition of time set in the lockout duration of the lockout policy 510 to the present time. Then, the lockout-information management part 136 returns information to the embedded-data analysis part 135 as a result of the lockout information update processing (S509), indicating that the authentication sheet is being locked out.

On the other hand, if the number of personal identification failure times is less than the number of times specified in the lockout condition (NO in S507), or if the success of the personal identification is indicated by the embedded-data analysis part 135 (YES in S504), the lockout-information management part 136 sets the number of personal identification failure times of the current lockout information to "0" and "does not set" the lockout time limit (S510). Thus, the lockout of the authentication sheet is cancelled. Next, the lockout-information management part 136 returns information to the embedded-data analysis part 135 as a result of the lockout information update processing (S511), indicating that the lockout of the authentication sheet has been cancelled.

Note that the condition of the lockout may be set as occasion demands. For example, the authentication sheet may immediately be locked out if the personal identification fails even once. Furthermore, the authentication sheet that has once been locked out may not be permitted to be used for an indefinite period. However, as in the embodiment of the present invention, setting the condition of the number of personal identification failure times and the time limit of the lockout can provide an authorized operator with a second chance (flexibility), for example, when the operator erroneously sets the personal identification sheet by chance.

As described above, in the image forming apparatus 10 according to the embodiment of the present invention, an operator can be authenticated based on the authentication information extracted from the image scanned from the authentication sheet by the scanner 12 (image scanning unit). Accordingly, the adoption of a dedicated authentication device is not required. As a result, an increase in the adoption cost of the image forming apparatus 10 can be avoided.

Furthermore, an operator can be identified according to the personal identification method recorded in the authentication sheet. If the personal identification fails, the authentication sheet is locked out (invalidated). Accordingly, this can significantly reduce the possibility of unauthorized use of the authentication sheet by others.

The present invention is not limited to the specifically disclosed embodiments, and variations and modifications may be made without departing from the scope of the present invention.

The present application is based on Japanese Priority Application No. 2008-317330 filed on Dec. 12, 2008, the entire contents of which are hereby incorporated herein by reference.

What is claimed is:

1. An image forming apparatus comprising:
a personal identification method acquisition unit that extracts an identification method for identifying an operator from a first image scanned by an image scanning unit;
a verification information extraction unit that extracts verification information with respect to personal identification information of the operator from the first image;
a personal identification information acquisition unit that acquires the personal identification information in accordance with the identification method, the personal identification information acquisition unit configured to instruct the image scanning unit to scan a second image and the personal identification information acquisition unit acquiring the personal identification information from the second image scanned by the image scanning unit, if the identification method indicated in the first image instructs the image forming apparatus to identify the operator via the second image, and the personal identification information acquisition unit acquiring the personal identification information from the operator via an operations panel of the image forming apparatus, if the identification method indicated in the first image instructs the image forming apparatus to identify the operator via the operations panel of the image forming apparatus;
a verification unit that verifies the acquired personal identification information with the verification information; and
an authentication unit that authenticates the operator based on authentication information of the operator extracted from the first image when the personal identification information matches with the verification information.

2. The image forming apparatus according to claim 1, further comprising:
a personal identification failure information storage unit that stores, when the personal identification information and the verification information do not match with each other, personal identification failure information in a storage unit in such a manner as to be associated with a predetermined identifier extracted from the first image, the personal identification failure information indicating a failure of identification of the operator; and
a determination unit that determines validity of the first image based on the personal identification failure information.

3. The image forming apparatus according to claim 2, wherein
the determination unit determines that the image is valid when a predetermined period elapses after storage of the personal identification failure information in the storage unit.

4. An authentication method executed by an image forming apparatus, the method comprising:
a personal identification method acquisition step of extracting an identification method for identifying an operator from a first image scanned by an image scanning unit;
a verification information extraction step of extracting verification information with respect to personal identification information of the operator from the first image;
a personal identification information acquisition step of acquiring the personal identification information in accordance with the identification method, the personal identification information acquisition step instructing the image scanning unit to scan a second image and the personal identification information acquisition step acquiring the personal identification information from the second image scanned by the image scanning unit, if the identification method indicated in the first image instructs the image forming apparatus to identify the operator via the second image, and the personal identification information acquisition step acquiring the personal identification information from the operator via an operations panel of the image forming apparatus, if the identification method indicated in the first image instructs the image forming apparatus to identify the operator via the operations panel of the image forming apparatus;
a verification step of verifying the acquired personal identification information with the verification information; and
an authentication step of authenticating the operator based on authentication information of the operator extracted from the first image when the personal identification information matches with the verification information.

5. A non-transitory storage medium having stored therein a program that causes an image forming apparatus to execute:
a personal identification method acquisition step of extracting an identification method for identifying an operator from a first image scanned by an image scanning unit;
a verification information extraction step of extracting verification information with respect to personal identification information of the operator from the first image;
a personal identification information acquisition step of acquiring the personal identification information in accordance with the identification method, the personal identification information acquisition step instructing the image scanning unit to scan a second image and the personal identification information acquisition step acquiring the personal identification information from the second image scanned by the image scanning unit, if the identification method indicated in the first image instructs the image forming apparatus to identify the operator via the second image, and the personal identification information acquisition step acquiring the personal identification information from the operator via an operations panel of the image forming apparatus, if the identification method indicated in the first image instructs the image forming apparatus to identify the operator via the operations panel of the image forming apparatus;
a verification step of verifying the acquired personal identification information with the verification information; and
an authentication step of authenticating the operator based on authentication information of the operator extracted from the first image when the personal identification information matches with the verification information.

6. The non-transitory storage medium having stored therein the program according to claim 5, wherein the program comprises:
a personal identification failure information storage step of storing, when the personal identification information and the verification information do not match with each other, personal identification failure information in a storage unit in such a manner as to be associated with a predetermined identifier extracted from the first image, the personal identification failure information indicating a failure identification of the operator; and a determination step of determining validity of the first image based on the personal identification failure information.

7. The non-transitory storage medium having stored therein the program according to claim 6, wherein, in the determination step, the first image is determined to be valid when a predetermined period elapses after storage of the personal identification failure information.

* * * * *